US008677011B2

(12) United States Patent  (10) Patent No.: US 8,677,011 B2
Uchida  (45) Date of Patent: Mar. 18, 2014

(54) LOAD DISTRIBUTION SYSTEM, LOAD DISTRIBUTION METHOD, APPARATUSES CONSTITUTING LOAD DISTRIBUTION SYSTEM, AND PROGRAM

(75) Inventor: Satoshi Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 21 days.

(21) Appl. No.: 13/192,270

(22) Filed: Jul. 27, 2011

(65) Prior Publication Data

US 2011/0283016 A1 Nov. 17, 2011

Related U.S. Application Data

(63) Continuation of application No. PCT/JP2010/072636, filed on Dec. 16, 2010.

(30) Foreign Application Priority Data

Dec. 17, 2009 (JP) .................................. 2009-286811

(51) Int. Cl.
*G06F 15/16* (2006.01)

(52) U.S. Cl.
USPC .......................................... 709/235; 709/232

(58) Field of Classification Search
USPC .................................................. 709/232, 235
See application file for complete search history.

(56) References Cited

U.S. PATENT DOCUMENTS

| 7,643,421 | B2 | 1/2010 | Tsuge et al. | |
|---|---|---|---|---|
| 2006/0209688 | A1* | 9/2006 | Tsuge et al. | 370/229 |
| 2008/0285578 | A1* | 11/2008 | DeLay et al. | 370/412 |
| 2012/0023231 | A1* | 1/2012 | Ueno | 709/225 |

FOREIGN PATENT DOCUMENTS

| JP | 2004-56737 A | 2/2004 |
|---|---|---|
| JP | 2006-245841 A | 9/2006 |
| WO | WO 2010/106772 A1 | 9/2010 |

OTHER PUBLICATIONS

Valeria Cardellini and Emiliano Casalicchio, "The State of the Art in Locally Distributed Web-Server Systems," ACM Computing Surveys, vol. 34, No. 2, Jun. 2002, pp. 263-311.
Nikhil Handigol, et al., "Plug-n-Serve: Load-Balancing Web Traffic using OpenFlow", SIGCOMM 2009 DEMOS, [online], searched on Dec. 10, 2009, Internet <URL:http://conferences.sigcomm.org/sigcomm/2009/demos/sigcomm-pd-2009-final26.pdf>.

(Continued)

*Primary Examiner* — Asghar Bilgrami
(74) *Attorney, Agent, or Firm* — McGinn Intellectual Property Law Group, PLLC

(57) ABSTRACT

A load distribution system that can further reduce load on a single apparatus and a network and that can distribute load for each process. The load distribution system of the present invention comprises: at least one packet forwarding apparatus comprising a packet forwarding unit that forwards a packet by using a forwarding rule sent from a flow control apparatus and a flow end check unit that detects a flow end; a load distribution apparatus that determines a load distribution destination from among a plurality of service provider servers by referring to a flow end notification sent from the flow control apparatus; and a flow control apparatus comprising a flow route setting unit that determines a forwarding route for a flow using a service provider server determined by the load distribution apparatus and notifies a packet forwarding apparatus on the forwarding route of a forwarding rule realizing the forwarding route and a flow end determination unit that notifies the load distribution apparatus of a flow end, based on flow end information detected by the packet forwarding apparatus.

17 Claims, 25 Drawing Sheets

(56) References Cited

OTHER PUBLICATIONS

Hiroshi Ueno et al., CPSY2009-36, "A Study on Deployment of Network Appliance Functionalities in Datacenter Network", IEICE Technical Report, Nov. 13, 2009, vol. 109, No. 296, pp. 7-12.

Yohei Yoshida, "Programmable Flow Switch Tsushin Keiro o Jiyu ni Settei Dekiru Data Center o Matagu Kasoka Jitsugen", Nikkei Computer, Jul. 22, 2009, No. 735, pp. 114-116.

* cited by examiner

FIG. 9

| MESSAGE | INSTRUCTION CODE | INFORMATION INCLUDED IN ARGUMENTS |
|---|---|---|
| ROUTE SETTING REQUEST MESSAGE | IsPath | FLOW IDENTIFIER OR INFORMATION NECESSARY TO CREATE FLOW IDENTIFIER |
| DESTINATION DETERMINATION REQUEST MESSAGE | IsDest | OPERATION IDENTIFIER |
| LOAD DISTRIBUTION DESTINATION NOTIFICATION MESSAGE | Dest | OPERATION IDENTIFIER, (GROUP OF) LOAD DISTRIBUTION DESTINATION IDENTIFIERS |
| DESTINATION DETERMINATION MESSAGE | UnifyDest | OPERATION IDENTIFIER, DESTINATION IDENTIFIER |
| FORWARDING RULE SETTING MESSAGE | SetRoute | FORWARDING RULE |
| END CHECK INFORMATION SETTING MESSAGE | CheckPoint | FLOW IDENTIFIER, GROUP OF CHECK APPARATUS IDENTIFIERS OR FORWARDING ROUTE INFORMATION |
| FLOW END NOTIFICATION MESSAGE | Fin | FLOW IDENTIFIER |
| PROCESS END NOTIFICATION MESSAGE | Fin | OPERATION IDENTIFIER |
| FORWARDING RULE DELETION MESSAGE | DelRoute | FLOW IDENTIFIER OR FORWARDING RULE |

LOAD DISTRIBUTION SYSTEM, LOAD DISTRIBUTION METHOD, APPARATUSES CONSTITUTING LOAD DISTRIBUTION SYSTEM, AND PROGRAM

CROSS REFERENCES TO RELATED APPLICATIONS

This application is a continuation of International Patent Application No. PCT/JP2010/072636, filed on Dec. 16, 2010, and claims priority to Japanese Patent Application No. 2009-286811, filed on Dec. 17, 2009, both of which are incorporated herein by reference in their entireties.

TECHNICAL FIELD

The present invention relates to a load distribution system, a load distribution method, apparatuses constituting a load distribution system, and a computer program. In particular, it relates to: a load distribution system having a flow control apparatus determining a packet forwarding route between a client and a server; a load distribution method; and computer program for a load distribution.

BACKGROUND

Non-Patent Document 1 discloses an example of a load distribution system that distributes load on web servers. Configuration modes of load distribution systems can roughly be classified into three modes. In two modes, a single IP (address) is used, and in the other mode, multiple IPs (addresses) are used.

The first mode using a single IP is a system in which a representative node is set (hereinafter, referred to as a representative-node-type system), configuration examples of which are illustrated in FIGS. 21 and 22. The representative-node-type system includes a Web Switch including a load distribution means and a server group handling services and providing results. FIG. 21 illustrates a basic system referred to as a 2-way architecture. When requested by a client for provision of a service, the Web Switch including the load distribution means examines load or the like on each of the servers and determines a service provider server. The Web Switch replaces address information with an internal IP or an internal virtual IP (virtual IP will be hereinafter referred to as VIP) and encapsulates information to be transferred, so that after a session is newly established with a server, the server can process the information. Namely, the Web Switch executes conversion so that the load distribution destination server can understand requests. The load distribution destination server sends results to the Web Switch including the load distribution means. Before forwarding the results to the client, the Web Switch including the load distribution means uses its own IP to replace a source IP therewith or re-encapsulates the results. In this way, the Web Switch can respond to the client as if the Web Switch generated the results. A method of converting addresses is referred to as a NAT (Network Address Translation) technique, and a method of covering requests or results by using a different communication method is referred to as an encapsulation technique. In this way, the client can receive a correct response.

In contrast to FIG. 21, FIG. 22 illustrates a 1-way architecture in which the Web Switch including the load distribution means does not re-convert the results. A difference from the 2-way architecture resides in that a route is prepared in which the results can be sent to the client without flowing through the Web Switch including the load distribution means. In addition, for example, each of the servers has a function of receiving a packet whose destination address is the Web Switch including the load distribution means and a function of changing a source address to an IP of the Web Switch including the load distribution means when responding and sending the packet. In this way, it is possible to realize a forwarding system referred to as DSR (Direct Server Return), which can pretend as if the Web Switch responds. Thus, since the results can directly be sent to the client, in terms of transmission of the results, workload caused on the Web Switch including the load distribution means can be reduced.

In these representative-node-type systems, since all the packets such as requests are aggregated to a representative node, load can be distributed by using various information, counted as an advantage. However, since all the packets are aggregated, the representative node easily results in a performance bottleneck, counted as a disadvantage. In addition, since only superficial IP conversion is executed in the NAT system, the representative-node-type systems cannot execute processing if the IP is embedded in a protocol deep part, counted as a disadvantage. In addition, in the DSR system, as a mechanism enabling each server to handle the IP/VIP of the Web Switch including the load distribution means, each server, not the Web Switch itself, needs to be configured to have NAT-related functions. Thus, the load amount of each server is increased, and work such as NAT-related settings needs to be implemented in all the servers, counted as disadvantages.

Another mode using a single IP is a system in which a single IP is set in the individual servers and an appropriate server makes a response (hereinafter referred to as a distribution-type system). As illustrated in a configuration example in FIG. 23, the distribution-type system includes a server group that includes a load distribution means and that is connected to a network capable of handling the same IPs. As the load distribution means, the server group may include a dedicated protocol so that a request can be forwarded or a process can be taken over. As another example, a process selection method may be determined in advance based on a client IP or the like, so that servers only respond to processes corresponding thereto. In the distribution-type system, for example, since a single IP can be set, unlike the representative-node-type systems, load aggregation to a single apparatus can be avoided, counted as an advantage. However, load is increased by a dedicated protocol process or a response selection process. In addition, since all the servers need to receive a packet at least once, multicast/broadcast process load on routers is increased or packet load in the network because of the above load is increased. As a result, a bottleneck is caused in the network itself, counted as a disadvantage.

In contrast to the above two systems, a mode using multiple IPs is a system in which DNS balancing is executed. FIG. 24 illustrates a configuration example of this system, in which a different global IP is prepared for each server, and the load distribution means selects a responding server at the time of a DNS response. In this way, since a single node is present only at the time of a DNS query, a load distribution system in which load on a single node is decreased can be provided, counted as an advantage. However, many global IPs are required, and because of the DNS cache of a client or a relay server, load distribution assumed by the DNS server side cannot be executed, counted as disadvantages. Further, while there is a system in which global IPs are converted into VIPs to execute load balancing, more global IPs are required and complex processes for flexibly taking over virtual IPs are required. Thus, the system does not provide a fundamental solution.

Since each of the existing load distribution systems has advantages and disadvantages, an appropriate system needs to be selected in view of where and how calculators are used. Therefore, users have had to use such existing load distribution systems in a hybrid manner to supplement the disadvantages. Namely, there has been no system where a single IP address is used, scalability is ensured, and a single node with aggregated load is not present or a single node with aggregated but smallest possible load is present.

Aside from the above systems using the single IP and multiple IPs, Non-Patent Document 2 discusses a system referred to as "Plug-n-Serve" that realizes smart load distribution to shorten the response time between a server and a client. FIG. 25 illustrates a conceptual diagram of Plug-n-Serve. The load distribution system Plug-n-Serve in FIG. 25 uses a concept referred to as OpenFlow, in which switches can be controlled from the outside. Based on OpenFlow, an external controller can set a forwarding rule and the like in each of the switches at an arbitrary timing, and the switches forward packets in accordance with the forwarding rule. In addition, in case no such forwarding rule corresponding to the packet exists, each of the switches has a function of explicitly querying the external controller about the forwarding rule. Plug-n-Serve is established on OpenFlow-compliant OpenFlow switches and includes an OpenFlow controller including Net Manager monitoring the network state, Host Manager monitoring the server state, and Flow Manager determining a network flow route in accordance with a load distribution algorithm.

Plug-n-Serve having such configuration operates as follows. The same IP alias is set in all servers. When at least one OpenFlow switch detects a new request sent from a client to a server IP, the OpenFlow switch requests the OpenFlow controller to set a network flow path. Flow Manager acquires the network state from Net Manager and the server state from Host Manager, determines a service provider server and a path to the server in accordance with a load distribution algorithm, and sets the server and the path in OpenFlow switches. Since a network flow path is set in this way, the traffic control to a certain server is executed during provision of a service. In addition, by monitoring switches at periodic intervals, Net Manager can monitor the network topology, the network utilization state, the link state, and the like and can notify the OpenFlow controller of these states. In this way, the load distribution means executes a load distribution destination determination process only at the time of a service request. Only the switches in which a path is set and the server processing a service execute the subsequent processes to respond to the client. Thus, since load aggregation to a single apparatus is avoided and communication on an optimum route is executed, the response time is optimized. Furthermore, since a single IP is used, depletion of IP addresses or the like can be prevented, counted as an advantage.

Non-Patent Document 1: VALERIA CARDELLINI and EMILIANO CASALICCHIO, "The State of the Art in Locally Distributed Web-Server Systems," ACM Computing Surveys, Vol. 34, No. 2, June, 2002, pp. 263-311

Non-Patent Document 2: Nikhil Handigol, et al., "Plug-n-Serve: Load-Balancing Web Traffic using OpenFlow", SIGCOMM 2009 DEMOS, [online], searched on Dec. 10, 2009, Internet <URL:http://conferences.sigcomm.org/sigcomm/2009/demos/sigcomm-pd-2009-final26.pdf>

SUMMARY

The entire disclosures of Non-Patent Documents 1 and 2 are incorporated herein by reference thereto. In the following, analyses are given by the present invention. The first problem of the above load distribution system Plug-n-Serve is that load about monitored statistics information and alive monitoring information communicated via a network is high and load on the monitoring apparatus is increased. This is because Net Manager periodically monitors the information. Thus, since Net Manager always needs to monitor all the switching apparatuses to check if a link is established for all the flows during load distribution, load required to collect the monitoring information is incurred on the network. In addition, the monitoring process load required to determine the network utilization state, the link state, and the like at monitoring sampling intervals is aggregated to the monitoring Net Manager itself.

Another problem of the above load distribution system Plug-n-Serve is that a process (flow) end cannot be determined explicitly on time. This is because, as in the case of the above first problem, since Net Manager periodically executes monitoring, the communication state, namely, the link state and the like, can only be determined by time-out processing using a timer. In this way, a determination involving communication temporary halt or temporary stagnation is difficult. Further, to cope with the temporary stagnation, the time-out period of the timer needs to be adjusted. However, if this time-out period is set to be too short, an erroneous determination is easily made. In contrast, if the time-out period is set to be too long, a process continuation determination is delayed. Thus, since a single server is easily fixed as a process load distribution destination, uniform load distribution cannot be easily realized.

The present invention has been made in view of the above circumstances and provides a load distribution system that can further reduce load on a single apparatus and a network and that can equally distribute load for each process.

According to a first aspect of the present invention, there is provided a load distribution system, comprising: at least one packet forwarding apparatus comprising a packet forwarding unit that forwards a packet by using a transfer rule sent from a flow control apparatus and a flow end check unit that detects a flow end; a load distribution apparatus determining a load distribution destination from among a plurality of service provider servers by referring to a flow end notification sent from the flow control apparatus; and a flow control apparatus comprising a flow route setting unit determining a forwarding route for a flow using a service provider server determined by the load distribution apparatus and notifying a packet forwarding apparatus on the forwarding route of a forwarding rule realizing the forwarding route and a flow end determination unit notifying the load distribution apparatus of a flow end, based on flow end information detected by the packet forwarding apparatus.

According to a second aspect of the present invention, there are provided apparatuses forming the above load distribution system, namely, there are provided at least one packet forwarding apparatus, a load distribution apparatus, and a flow control apparatus.

According to a third aspect of the present invention, there is provided a load distribution method, comprising: causing a load distribution apparatus to refer to a flow end notification sent from a flow control apparatus and to determine a load distribution destination from among a plurality of service provider servers; causing the flow control apparatus to determine a forwarding route for a flow using a service provider server determined by the load distribution apparatus and to notify a packet forwarding apparatus on the forwarding route of a forwarding rule realizing the forwarding route; causing the packet forwarding apparatus to use a forwarding rule sent from the flow control apparatus, to forward a packet, to inspect whether the forwarded packet is a flow end packet, and to send a report to the flow control apparatus; and causing the flow control apparatus to notify the load distribution apparatus of a flow end, based on a report that the packet forwarding apparatus has forwarded a flow end packet. The present method is connected to certain machines, that is, to a packet forwarding apparatus, a load distribution apparatus, and a flow control apparatus.

According to a fourth aspect of the present invention, there is provided a program causing apparatuses forming the above load distribution system, namely, at least one packet forwarding apparatus, a load distribution apparatus, and a flow control apparatus, to execute the above load distribution method. This program can be recorded in a recording medium readable by computers forming the individual apparatuses. Namely, the present invention can be realized as a computer program product. Also the program may be regarded as either a program product (i.e. manufacture) or a process embodying the load distribution method (process), expressed in a program language.

The meritorious effects of the present invention are summarized as follows.

According to the present invention, load on a single apparatus and a network can be reduced. This is because the present invention is configured to include a function of checking a process (flow) end (i.e. termination) to grasp the load distribution state, without detriment to features of OpenFlow. In addition, since such configurations are adopted, when a load distribution destination is determined, aggregation to a load distribution apparatus can be avoided, and the need for a periodic network flow state monitoring process for determining the end of a service during load distribution can be eliminated. In addition, since such configurations are adopted, load can be distributed for each service stably. Thus, various problems associated with setting of the time-out period can be solved, such as an erroneous end determination during a halt of a service, a load distribution destination being fixed or undetermined during provision of a service during the time-out period.

BRIEF DESCRIPTION OF THE DRAWINGS

FIG. 9 is a message list used to illustrate specific operations of the present invention.

PREFERRED MODES

Figure 1:
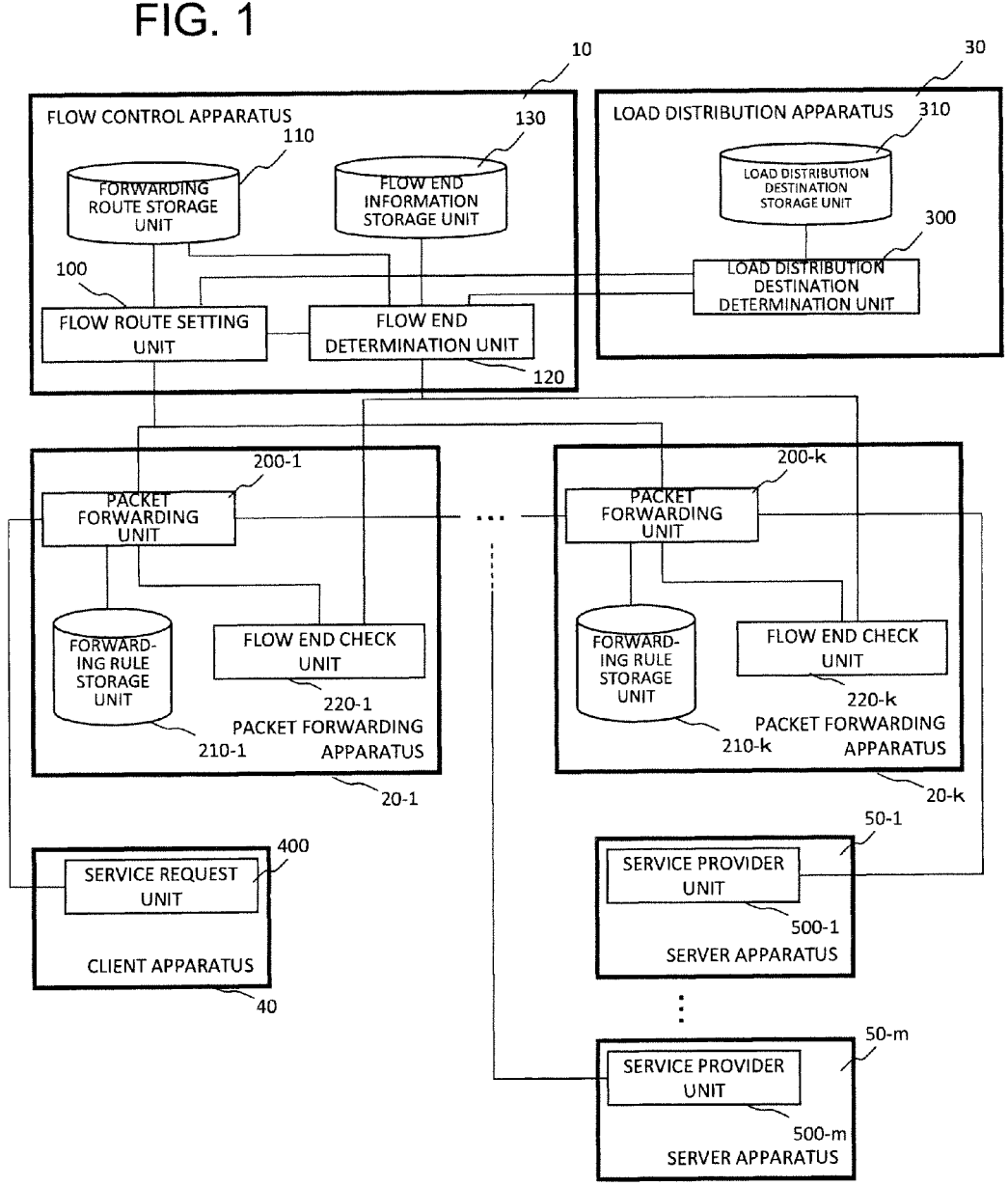
FIG. 1 is a block diagram illustrating a configuration of a first exemplary embodiment of the present invention.

First, an outline of an exemplary embodiment of the present invention will be described with reference to FIG. 20. A load distribution system according to an exemplary embodiment of the present invention includes: one or more packet forwarding apparatuses 2001 to 2003; a load distribution apparatus 1200; and a flow control apparatus 1100 and distributes processes (flows) requested by clients 3001 and 3002 to server apparatuses 4001 to 4004. The reference characters in this outline are used only as examples to facilitate comprehension and are not intended to limit the present invention to the illustrated modes.

According to the present invention, the following modes are possible.

[Mode 1]
The load distribution system according to the first aspect.

[Mode 2]
It is preferable that the flow control apparatus comprise a forwarding route storage unit storing a forwarding route for a flow using a service provider server determined by the load distribution apparatus. In addition, it is preferable that the flow control apparatus delete route information about the ended flow from the forwarding route storage unit, based on flow end information detected by the packet forwarding apparatus, and instruct a packet forwarding apparatus located on the route to be deleted to delete a forwarding rule for the ended flow.

[Mode 3]
It is preferable that the flow control apparatus further comprise a flow end information storage unit storing flow end information detected by the packet forwarding apparatus. In addition, it is preferable that, when deletion of route information about the ended flow from the forwarding route storage unit and instructions to a packet forwarding apparatus located on the route to be deleted to delete a forwarding rule for the ended flow are completed, the flow control apparatus delete the flow end information from the flow end information storage unit.

[Mode 4]

It is preferable that, when a flow forwarding route is determined, the flow route setting unit create end check information indicating a packet forwarding apparatus determining the end of the flow on the determined flow forwarding route and notify the flow end determination unit of the end check information. In addition, it is preferable that the flow end determination unit determine a flow end by using the end check information.

[Mode 5]

It is preferable that the load distribution apparatus comprise: a load distribution destination storage unit storing a service provider server determined as the load distribution destination; and a load monitoring unit monitoring load on a calculator serving as the packet forwarding apparatus or the service provider server. In addition, it is preferable that the load distribution apparatus manage an allocation state of service provider servers by deleting a service provider server for the ended flow from the load distribution destination storage unit, based on a flow end notification sent from the flow control apparatus. In addition, it is preferable that the load distribution destination determination unit determine a load distribution destination from among the plurality of service provider servers, based on an allocation state of each service provider server managed by the load distribution destination storage unit and a load state of each apparatus monitored by the load monitoring unit.

[Mode 6]

It is preferable that the load distribution apparatus select a plurality of load distribution destinations from among the plurality of service provider servers and that the flow route setting unit select one service provider server from among the plurality of load distribution destinations by using a predetermined route determination rule.

[Mode 7]

It is preferable that the flow route setting unit notify the load distribution apparatus of a service provider server selected from among the plurality of load distribution destinations and that the load distribution apparatus update an allocation state of each service provider server managed by the load distribution destination storage unit, based on the notification.

[Mode 8]

The packet forwarding apparatus according to the second aspect.

[Mode 9]

The flow control apparatus according to the second aspect.

[Mode 10]

The load distribution method according to the third aspect. As in the case of the load distribution system according to mode 1, the individual components or steps of the packet forwarding apparatus, the flow control apparatus, and the load distribution method can be expanded to the contents of modes 2 to 7.

The flow control apparatus 1100 includes: a flow route setting unit requesting the load distribution apparatus 1200 to determine a load distribution destination in response to a forwarding route determination request from a packet forwarding apparatus (the packet forwarding apparatus 2001, for example) that has received a new packet, for example, from the client (3001, 3002), determining a flow forwarding route (2001, 2002, 4001, for example) using a determined service provider server (the server apparatus 4001, for example), and notifying packet forwarding apparatuses (packet forwarding apparatuses 2001 and 2002, for example) on the forwarding route of a forwarding rule realizing the forwarding route; and a flow end determination unit subsequently notifying (reporting) the load distribution apparatus 1200 of a flow end, based on flow end information detected by the packet forwarding apparatuses (packet forwarding apparatuses 2001 and 2002, for example).

The load distribution apparatus 1200 refers to a flow end notification sent from the flow control apparatus 1100 to determine a load distribution destination from among a plurality of service provider servers.

Each of the packet forwarding apparatuses 2001 to 2003 includes: a packet forwarding unit that forwards an input packet in accordance with a flow forwarding rule sent from the flow control apparatus 1100 and, as described above, requests the flow control apparatus 1100 to determine a forwarding route for a packet that does not match the forwarding rule; and a flow end check unit that checks whether or not a transmitted packet is a flow end packet and notifies (reports) the flow control apparatus 1100 of the results.

Since such configuration is adopted, periodic monitoring of a network is not needed, and load distribution control using a flow (process) end notification is realized for each flow (process).

First Exemplary Embodiment

Next, a first exemplary embodiment of the present invention will be described in detail with reference to the drawings. FIG. 1 is a block diagram illustrating a configuration of the first exemplary embodiment of the present invention. In FIG. 1, a load distribution system according to the first exemplary embodiment of the present invention includes a flow control apparatus 10, packet forwarding apparatuses 20-1 to 20-$k$, and a load distribution apparatus 30.

The flow control apparatus 10 includes: a flow route setting unit 100 determining a flow forwarding route and setting a forwarding rule in each of the packet forwarding apparatuses 20-1 and 20-$k$; a forwarding route storage unit 110 storing flow forwarding routes; a flow end determination unit 120 determining a flow end based on a notification from each of the packet forwarding apparatuses 20-1 to 20-$k$; and a flow end information storage unit 130 storing a flow end state used to determine a flow end.

The packet forwarding apparatuses 20-1 to 20-$k$ include: the forwarding rule storage units 210-1 to 210-$k$ storing forwarding rules referred to for obtaining the destination of the packet; the packet forwarding units 200-1 to 200-$k$ referring to forwarding rules and executing a packet forwarding process; and flow end confirmation units 220-1 to 220-$k$ distinguishing a flow end packet based on packet information.

The load distribution apparatus 30 includes: a load distribution destination determination unit 300 determining a service provider realizing load distribution; and a load distribution destination storage unit 310 storing determined service providers.

A client apparatus 40 includes a service request unit 400 requesting any one of the above packet forwarding apparatuses 20-1 and 20-$k$ for provision of services.

Each of the server apparatuses 50-1 to 50-$m$ includes a service provider unit 500 that executes a process corresponding to a service request received from the client apparatus 40 and that sends results via the packet forwarding apparatuses 20-1 and 20-2 to provide a service. The number of the server apparatuses 50-1 to 50-*m* is m, all of which have an identical network identifier. The flow control apparatus 10 and the load distribution apparatus 30 determine a communication route and a server apparatus, respectively. When a flow is generated, any one of the m server apparatuses 50-1 to 50-*m* provides the client apparatus 40 with a service.

Hereinafter, in the present description, when an apparatus or a unit is explicitly distinguished, a hyphen (-) and an apparatus number or a unit number is used, such as xxx-1 and xxx-2. When an apparatus or a unit is not explicitly distinguished, such hyphen (-) and number are omitted. A unit having a unit number identical to an apparatus number of an apparatus signifies that the unit is included in the apparatus. In addition, each of the letters k and m, which represent the number of the packet forwarding apparatuses 20 and the number of the server apparatuses, respectively, is an arbitrary integer of 1 or more.

Each of these units operates as follows. The flow route setting unit 100 determines a packet forwarding route for each flow and manages a flow set in each of the packet forwarding apparatuses.

More specifically, the flow route setting unit 100 receives a route setting request message for an unset flow from a packet forwarding unit 200. The route setting request message includes at least an instruction code representing the route setting request message and a flow identifier or information necessary to create a flow identifier. The flow identifier can be represented by a distinguishable arbitrary sequence number, an arbitrary combination of a packet port identifier, each protocol source, relay, and destination, or an arbitrary information bit combination of a packet port identifier, each protocol source, destination, and address. If notified of the information necessary to create a flow identifier, the flow route setting unit 100 creates a flow identifier from the information at this stage. For example, if an arbitrary sequence number is used as a flow identifier, the information necessary to create a flow identifier represents an arbitrary combination of a packet port identifier, each protocol source, relay, and destination or an arbitrary information bit combination of a packet port identifier, each protocol source, destination, and address. The flow route setting unit 100 creates an arbitrary sequence number allocated corresponding with the information necessary to create a flow identifier. Subsequently, the information and flow identifier are handled while being equivalently converted to each other. In the present case, this operation is simplified, and the description will be made based on a flow identifier.

Upon receiving a route setting request message for an unset flow from the packet forwarding unit 200, the flow route setting unit 100 checks whether forwarding route information about the flow exists in the forwarding route storage unit 110. If the forwarding route information about the flow exists, the flow route setting unit 100 calculates a forwarding rule for each packet forwarding apparatus 20 on the forwarding route and sends a forwarding rule setting message to each packet forwarding unit 200. The flow route setting unit 100 creates a forwarding rule setting message including at least an instruction code representing the forwarding rule setting message and a forwarding rule. The forwarding rule is represented by a flow identifier and a symbol string representing an operation (action) to be processed by a packet forwarding unit 200 handling the flow corresponding to the flow identifier. Examples of the operation (action) to be processed by the packet forwarding unit 200 include forwarding (delivering) a packet to a certain port of a switch and dropping a packet.

In addition, after determining a route, the flow route setting unit 100 stores the forwarding route information about the flow in the forwarding route storage unit 110. The flow route is stored for two purposes. One is to enable the flow end determination unit 120 to execute a flow end determination. The other is to execute resetting when a forwarding rule is deleted due to performance of a packet forwarding apparatus 20 (when an effective period set to the forwarding rule expires).

If the forwarding route information about the flow does not exist, the flow route setting unit 100 uses information included in the flow identifier to determine a forwarding route based on a certain index and network connection information (topology information). For example, such index is whether or not a destination is reachable in a route with the least network load or the shortest forwarding time. Dijkstra's algorithm is one example that is used to determine a forwarding route based on such index. In a method using Dijkstra's algorithm, first, halfway routes are obtained, and one that requires the least index load is calculated. Next, halfway routes that are one hop away from this calculated route are calculated as new halfway routes. By repeating this procedure until a target destination is reached, a destination reachable with the least index load can be uniquely determined.

To determine a forwarding route whose destination is a load-distribution-compliant server 50, the flow route setting unit 100 requests the load distribution destination determination unit 300 to determine a destination server, by sending a destination determination request message thereto. The destination determination request message includes at least an instruction code representing the destination determination request message, an identifier representing a load-distribution-compliant server, and a flow identifier. The unit identifier can be represented by using at least an arbitrarily associated sequence number or a flow identifier. If the unit identifier specifies the identifier representing a load-distribution-compliant server, the identifier representing a load-distribution-compliant server can be omitted. Information indicating the load-distribution-object servers can be stored in the flow route setting unit 100 when the system is established or modified.

The flow route setting unit 100 receives a load distribution destination notification message as a reply from the load distribution destination determination unit 300 and determines the forwarding route based on the sent load distribution destination. The load distribution destination notification message includes at least an instruction code representing the load distribution destination notification message and a destination server identifier. The destination server identifier represents a service provider and can be represented by a group of identifiers used in an arbitrary protocol or information extracted from topology information (information about a switch connection port), for example.

In addition, when determining a forwarding route, the flow route setting unit 100 can also determine a forwarding route for a reverse direction flow (a route in which a source and a destination written in the reply are reversed). These forwarding routes can be set simultaneously.

Upon receiving a flow end notification message from the flow end determination unit 120, the flow route setting unit 100 executes an ending process for the corresponding flow. The flow end notification message includes at least an instruction code representing the flow end notification message and a flow identifier. More specifically, the flow route setting unit 100 sends a forwarding rule deletion message to each of the packet forwarding units 200 of the packet forwarding apparatuses 20 on the forwarding route and deletes the corresponding flow forwarding route from the forwarding route storage unit 110. The flow route setting unit 100 creates the forwarding rule deletion message by including at least an instruction code representing a forwarding rule deletion message and a flow identifier or a forwarding rule.

The forwarding route storage unit 110 is accessed by the flow route setting unit 100 and the flow end determination unit 120 and refers, stores, and deletes flow forwarding route information. For example, the flow forwarding route information can be represented by a character string in which identifiers identifying apparatuses on a forwarding route are combined by certain connectors. In addition, not only the apparatuses, the flow forwarding route information can also represent more detailed information such as ports of the apparatuses.

Upon receiving the flow end notification message from the flow end check unit 220, the flow end determination unit 120 executes a flow end determination. In addition, the flow end determination unit 120 stores flow end information necessary for the end determination in the flow end information storage unit 130. In addition, the flow end determination unit 120 refers to the forwarding route storage unit 110 to acquire forwarding route information necessary for the flow determination. In the present exemplary embodiment, a flow end is deemed to be the end of provision of a service.

For example, a flow end can be determined when the flow end determination unit 120 receives a flow end notification message from each of the packet forwarding apparatuses 20 on the forwarding route. Alternatively, a flow end can be determined when the flow end determination unit 120 receives a flow end notification message from the packet forwarding apparatuses 20 at both ends on the forwarding route. The flow end information necessary for the end determination is determined depending on the above flow end determination method. For example, a flow identifier and an identifier of the packet forwarding apparatus 20 that has sent a flow end notification message for a corresponding flow or an identifier necessary for the determination of end among the identifiers of the packet forwarding apparatuses 20. Alternatively, for example, a combination of identifier(s) of packet forwarding apparatus(es) 20 and flow end notification state(s) may be used.

When the flow end determination unit 120 determines a flow end, the flow end determination unit 120 sends a flow end notification message to the flow route setting unit 100 for deletion of the flow forwarding route. In addition, the flow end determination unit 120 sends a process end notification message to the load distribution destination determination unit 300 for deletion of the service provider server information. The flow end determination unit 120 creates the process end notification message by including at least an instruction code representing the process end notification message and a flow identifier (or an entry identifier). Finally, the flow end determination unit 120 deletes the flow end information about the corresponding flow from the flow end information storage unit 130.

The flow end information storage unit 130 is accessed by the flow end determination unit 120 and refers, stores, and deletes the corresponding flow end information about the flow.

The packet forwarding unit 200 executes processes to forward packets. Upon receiving a packet from any one of the packet forwarding unit 200 of an arbitrary packet forwarding apparatus 20, the service request unit 400 of the client apparatus 40, and the service provider unit 500 of an arbitrary server apparatus 50, the packet forwarding unit 200 checks whether a corresponding flow forwarding rule exists in the forwarding rule storage unit 210. If such forwarding rule exists, the packet forwarding unit 200 sends the packet to the next destination based on the forwarding rule.

If no corresponding flow forwarding rule exists, the packet forwarding unit 200 sends a route setting request message to the flow route setting unit 100 to request setting of a route. If setting of a route is being requested for the flow to which the received packet belongs, there is no need to newly request setting of a route. The received packet may be temporarily stored in the apparatus until a route is determined.

Upon receiving a forwarding rule setting message from the flow route setting unit 100, the packet forwarding unit 200 stores the forwarding rule in the forwarding rule storage unit 210 and starts sending the packet to the next destination based on the forwarding rule.

The forwarding rule storage unit 210 is accessed by the packet forwarding unit 220 and refers, stores, and deletes flow forwarding rules. Such forwarding rule storage unit 210 can be realized by using a mechanism equivalent to that of a flow table in OpenFlow.

The flow end check unit 220 is installed in all or certain packet forwarding apparatuses and checks and reports a flow end. More specifically, the flow end check unit 220 examines a packet forwarded by the packet forwarding unit 200 and monitors whether the corresponding flow has ended. If the flow end check unit 220 detects a flow end, the flow end check unit 220 requests the packet forwarding unit 200 to forward a flow end notification message.

The flow end check unit 220 can detect a flow end by various methods as below. For example, in one method, a protocol end message is checked. For example, in the TCP (Transmission Control Protocol), a FIN flag is checked. In this way, the end of communication, that is, the end of a flow using communication, can be detected. In practice, after a FIN flag, communication with an ACK packet is generated in a reverse-direction flow (a flow in which the source and the destination are reversed). Thus, by detecting the ACK flag in the reverse direction flow after the FIN packet, a flow end can be determined. Further, since the TCP is used in bidirectional communication, a pair of forward- and reverse-direction flows can be used to determine a flow end.

In another example, a flow end can be detected based on the E-bit in a DATA chunk in the SCTP (Stream Control Transmission Protocol).

Further, in another example, a flow end can be detected based on the HTTP (Hypertext Transfer Protocol). When a Connection attribute in a HTTP header detects Close and transmission of a corresponding HTTP message is confirmed, it is determined that a series of flows has ended.

Further, in another example, a flow end can be detected based on the IP (Internet Protocol). In an environment where a packet train is deemed as a single flow, since a packet end can be determined by an MF (More Fragments) flag in the IP, a flow end can be determined.

As flow end detection methods, check methods in arbitrary protocol hierarchies have thus been described. It is preferable that a flow end be monitored by a certain end determination bit(s) such as in the TCP, SCTP, or IP or by a procedure determined by the end determination bit and a certain bit representing a flow end, in terms of the processing speed. In this way, meritorious effects of the present invention are further increased.

While the flow end check unit 220 is illustrated in each of the packet forwarding apparatuses 20 in the present exemplary embodiment, the flow end check unit 220 may be installed in arbitrary packet forwarding apparatuses. This depends on the flow end determination method by the flow end determination unit 120. It is simply necessary that only the packet forwarding apparatuses 20 that need to execute notification of a flow end for the flow end determination include the flow end check unit 220.

The load distribution destination determination unit 300 determines a service provider for load distribution. Upon receiving a destination determination request message from the flow route setting unit 100, the load distribution destination determination unit 300 checks the load distribution destination storage unit 310 for a previously determined load distribution destination. If a load distribution destination exists in the load distribution destination storage unit 310, the load distribution destination determination unit 300 sends a load distribution destination notification message to the flow route setting unit 100 as the destination.

If no load distribution destination exists in the load distribution destination storage unit 310, the load distribution destination determination unit 300 determines a single service provider server in accordance with a load distribution algorithm. Various algorithms used in the present field can be used as the load distribution algorithm. For example, as a round robin, each server can be selected in a certain sequence. The load distribution destination determination unit 300 stores a service provider server determined in accordance with a load distribution algorithm in the load distribution destination storage unit 310, as a load distribution destination corresponding to the flow. The information to be stored includes a flow identifier and a destination server identifier. The load distribution destination is stored for two purposes. One is to enable the load distribution apparatus 30 to notify the flow control apparatus of a server that is in operation in case the flow control apparatus has deleted the route information because of changing of the topology information or the like. The other is to execute resetting in case a forwarding rule is deleted due to performance of a packet forwarding apparatus 20 (when the effective period set to the forwarding rule expires). The load distribution destination determination unit 300 sends the service provider server determined in accordance with the load distribution algorithm as a load distribution destination notification message to the flow route setting unit 100 as the destination.

Upon receiving a process end notification message from the flow end determination unit 120, the load distribution destination determination unit 300 deletes the load distribution destination of the corresponding flow from the load distribution destination storage unit 310.

The load distribution destination storage unit 310 is accessed by the load distribution destination determination unit 300 and manages (refers to, stores, and deletes) the load distribution destination corresponding to the flow (an allocation state of service provider servers).

The service request unit 400 communicate by using any one of the packet forwarding units 200 and requests and receives a desired service from the service provider unit 500.

The service provider unit 500 executes processes to respond to a request from the service request unit 400 and uses a plurality of packet forwarding units 200 for communication to provide a service.

Figure 2:
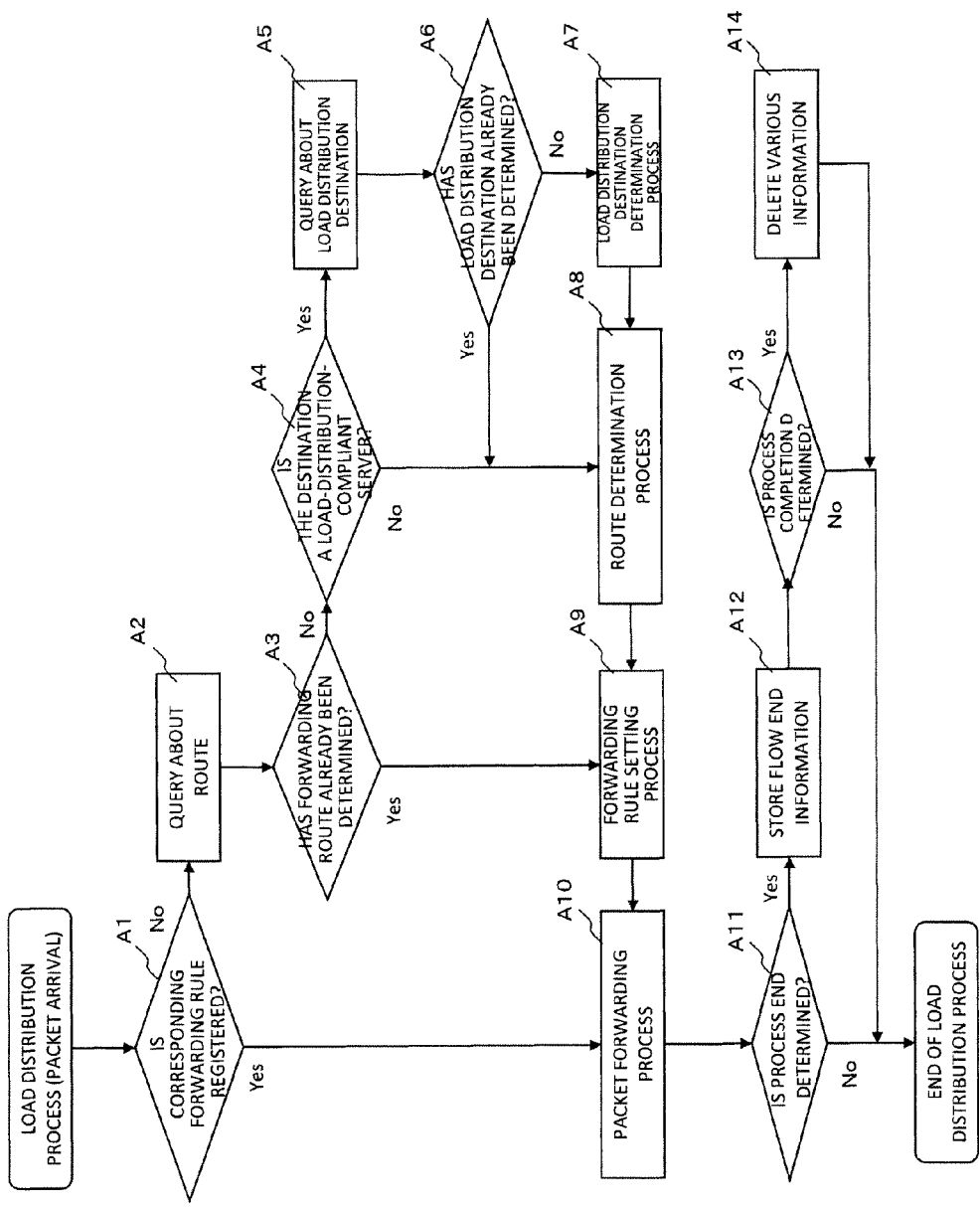
FIG. 2 is a flow chart illustrating an operation of the first exemplary embodiment of the present invention.

Next, an operation of the present exemplary embodiment will be described in detail with reference to the drawings. FIG. 2 is a flow chart illustrating an operation of the first exemplary embodiment of the present invention. In FIG. 2, first, when a packet arrives at the packet forwarding unit 200, a load distribution process is started ("load distribution process" in FIG. 2).

The packet forwarding unit 200 refers to the forwarding rule storage unit 210 to check whether a flow forwarding rule corresponding to the packet that has arrived exists (step A1).

If the flow forwarding rule exists (Yes in step A1), since the packet is not load-distribution-compliant or has a destination that has already been determined for load distribution, the packet forwarding unit 200 delivers the packet to a corresponding port in accordance with the forwarding rule (step A10).

If no forwarding rule exists (No in step A1), the packet forwarding unit 200 sends a route setting request message for the unset flow to the flow route setting unit 100 (step A2).

The flow route setting unit 100 identifies a flow based on information in the received route setting request message, refers to the forwarding route storage unit 110, and checks whether a forwarding route has already been determined (step A3).

In step A3, if a forwarding route is stored in the forwarding route storage unit 110, namely, if a corresponding flow forwarding route has already been determined (Yes in step A3), the flow route setting unit 100 creates a forwarding rule that needs to be set in the packet forwarding apparatus that has issued the route setting request message or in all the relay packet forwarding apparatuses on the route described in the route information. The flow route setting unit 100 sends a forwarding rule setting message to each of the packet forwarding units 200 to set the forwarding route therein. There is a case where the flow route setting unit 100 receives a route setting request message and the forwarding route is already stored in the forwarding route storage unit 110. While the packet is not load-distribution-compliant or has a destination that has already been determined for load distribution, the above case arises if the information is deleted due to memory requirements or the like of the packet forwarding apparatus. Whether the forwarding rule needs to be sent to the packet forwarding apparatus that has issued the route setting request message or to all the relay packet forwarding apparatuses on the route described in the route information is determined based on network specifications. If it is determined that the forwarding rule is sent to the packet forwarding apparatus that has issued the route setting request message, a packet forwarding apparatus that receives this packet on the forwarding route checks whether a forwarding rule exists in the same way and, if necessary, delivers a route setting request message.

Upon receiving the forwarding rule setting message, each packet forwarding unit 200 stores the forwarding rule in the corresponding forwarding rule storage units 210 (step A9).

If no forwarding route is stored (No in step A3), the flow route setting unit 100 determines whether the final destination of the packet is a load-distribution-compliant server (step A4). If the destination is not a load-distribution-compliant server (No in step A4), since an address is uniquely determined, the flow route setting unit 100 starts a route determination process (to step A8).

In the above step A4, if the final destination of the packet is a load-distribution-compliant server (Yes in step A4), the flow route setting unit 100 creates a destination determination request message to request to determine a load distribution destination and sends the message to the load distribution destination determination unit 300 (step A5).

Upon receiving the destination determination request message, the load distribution destination determination unit 300 refers to the load distribution destination storage unit 310 to check whether a load distribution destination has already been determined (step A6). There is a case where a load distribution destination has already been determined. Such case arises if the forwarding route information is missing for some reason, even if a load distribution destination has already been determined and the flow has already been started. Thus, to continue the flow, the load distribution destination storage unit 310 sends a previously determined load distribution destination as a result. Namely, the load distribution destination determination unit 300 creates a load distribution destination candidate notification message in which a load distribution destination registered in the load distribution destination storage unit 310 is written as the determined destination. The load distribution destination determination unit 300 sends the message to the flow route setting unit 100, which then starts a route determination process (Yes in step A6).

If no load distribution destination is determined (No in step A6), by referring to the load distribution destinations registered in the load distribution destination storage unit 310, the load distribution destination determination unit 300 determines a load distribution destination candidate in accordance with a load distribution algorithm. The determined load distribution destination candidate is stored in the load distribution destination storage unit 310. In addition, the load distribution destination determination unit 300 creates a load distribution destination candidate notification message in which the determined load distribution destination candidate is specified and sends the message to the flow route setting unit 100, which then starts a route determination process (step A7).

Next, whether the destination is a load-distribution-compliant server or not, since a service provider server has been determined, the flow route setting unit 100 determines a forwarding route in accordance with a route setting algorithm (step A8).

Next, since the flow forwarding route has been determined, the flow route setting unit 100 creates a forwarding rule for the packet forwarding apparatus that has issued the route setting request message or for the packet forwarding apparatuses on the route described in the route information. The flow route setting unit 100 sends the forwarding rule setting message to each of the packet forwarding units 200 and sets the forwarding route therein (step A9). Whether the forwarding rule needs to be sent to the packet forwarding apparatus that has issued the route setting request message or to all the relay packet forwarding apparatuses on the route described in the route information is determined based on network specifications. If it is determined that the forwarding rule is sent to the packet forwarding apparatus that has issued the route setting request message, a packet forwarding apparatus that receives this packet on the forwarding route checks whether a forwarding rule exists in the same way and, if necessary, delivers a route setting request message.

The packet forwarding unit 200 halts forwarding of the packet if no forwarding rule exists in the forwarding rule storage unit in step A1. However, since a forwarding route has been set in step A9, the packet forwarding unit 200 starts delivering the packet in accordance with the forwarding rule (step A10).

When the packet forwarding unit 200 forwards the packet, the flow end check unit 220 monitors the forwarded packet for a flow end (step A11). If a flow end is not determined, since the flow still continues, the packet forwarding unit 200 continues the packet forwarding process for load distribution, without changing the settings (No in step A11).

If a flow end is determined (Yes in step A11), the flow end check unit 220 sends a flow end notification message to the flow end determination unit 120. The flow end determination unit 120 refers to the flow end notification message and updates the flow end information storage unit 130 (step A12).

The flow end determination unit 120 determines a flow end based on updated flow end information (step A13). If a flow end is determined (Yes in step A13), a process of deleting various information is started. The flow end determination unit 120 sends a flow end notification message to the flow route setting unit 100 to delete the route information about the flow, sends a flow end notification message to the load distribution destination determination unit 300 to request deletion of the load distribution destination information, and deletes the flow end information about the corresponding flow from the flow end information storage unit 130.

The flow route setting unit 100 sends a forwarding rule deletion message to the packet forwarding units 200 on the route to request deletion of the route information and deletes the route information about the corresponding flow from the forwarding route storage unit 110.

Upon receiving the messages, the packet forwarding units 200 delete the forwarding rule(s) from the respective forwarding rule storage units 210, and the load distribution destination determination unit 300 deletes the corresponding load distribution destination information from the load distribution destination storage unit 310 (step A14).

The load distribution process is realized by executing the above series of processes for each packet as needed. In the present exemplary embodiment, the control apparatus, the packet forwarding apparatus, and the load distribution apparatus have a mechanism (or formulation) in which an initial packet is used to determine a distribution destination and a determined distribution destination is reflected to determine a forwarding route. In addition, it is so formulated that process end check units which explicitly check a process end are arranged, whereby the load distribution destination determination unit can be explicitly notified of a process end. Thus, the following two meritorious effects can be obtained.

The first meritorious effect is that load on a single apparatus and a network can be reduced. This is because, since a load distribution destination is determined by an initial packet, simply the packet forwarding apparatuses are needed to realize packet forwarding during provision of a service, and since process end check units that explicitly check a process end are arranged, the load distribution destination determination unit can be explicitly notified of the process end. In this way, when a load distribution destination is determined, aggregation to a load distribution apparatus can be avoided. In addition, the need for a periodic network flow state monitoring process for determining the end of a service during load distribution can be eliminated.

The second meritorious effect is that the load distribution for each service can be provided stably. This is because, since the packet forwarding apparatuses can monitor a flow end and explicitly determine the end of service provision, false recognition in determining the end of a service, which could arise if a time-out process is used, can be eliminated. In this way, an erroneous determination such as an erroneous determination of the end of a service during suspension can be prevented. In addition, an occurrence of an undetermined load distribution destination when a service is continuously provided during a time-out period can be prevented.

Second Exemplary Embodiment

Figure 3:
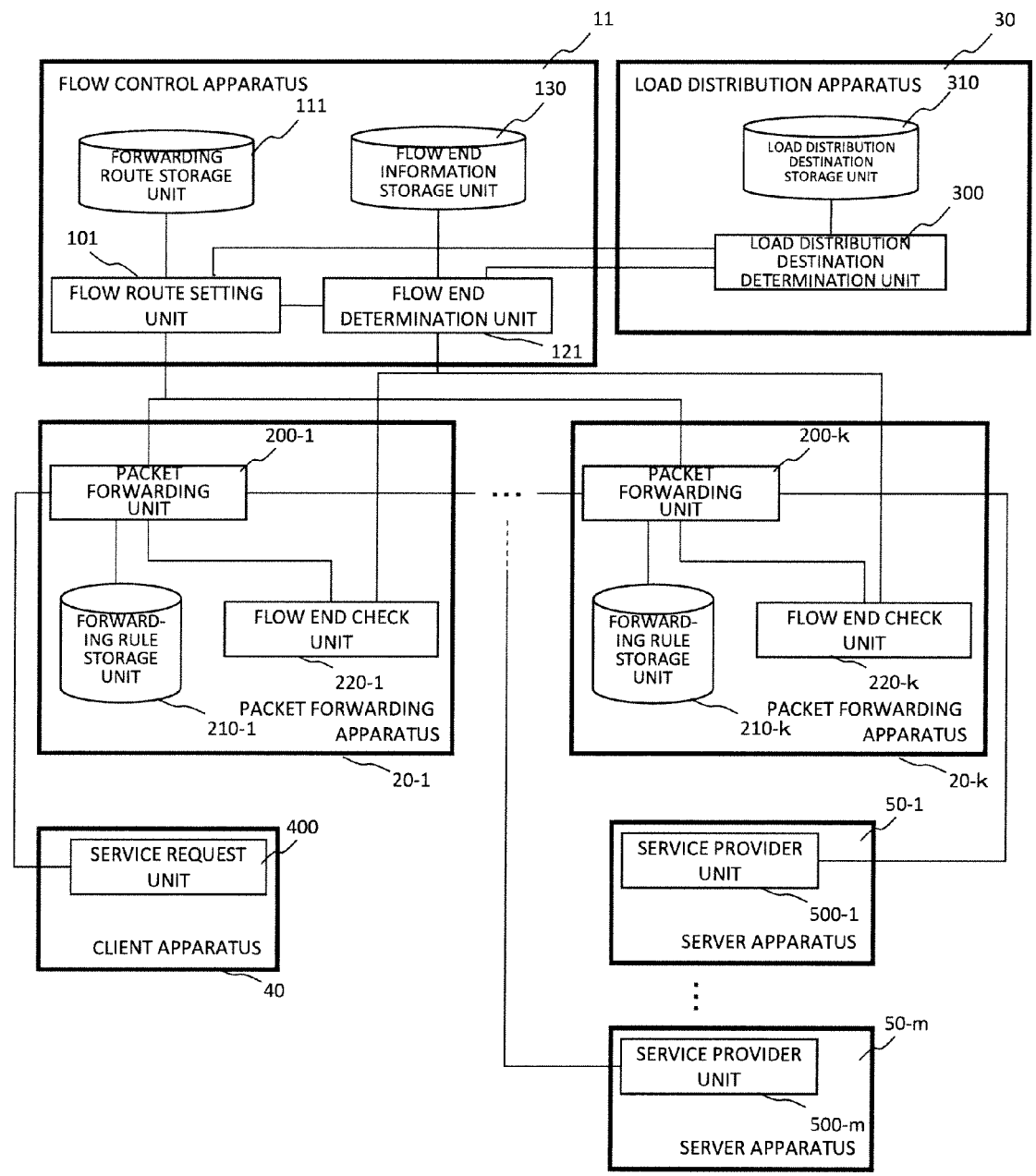
FIG. 3 is a block diagram illustrating a configuration of a second exemplary embodiment of the present invention.

Next, a second exemplary embodiment of the present invention will be described in detail with reference to the drawings. FIG. 3 is a block diagram illustrating a configuration of the second exemplary embodiment of the present invention. In FIG. 3, a load distribution system according to the second exemplary embodiment of the present invention is the same as that according to the first exemplary embodiment in that the load distribution system includes the flow control apparatus 11, the packet forwarding apparatuses 20-1 to 20-k, and the load distribution apparatus 30. The individual units also have substantially identical configurations. The difference in configuration is that the flow end determination unit 121 is not connected to the forwarding route storage unit 111 in the flow control apparatus 11.

This configuration is used to adopt a method in which information necessary for determining a service end is created and stored in advance in the flow end information storage unit 130. The configuration of the present exemplary embodiment will be hereinafter described with a focus on the difference from the first exemplary embodiment of the present invention.

In addition to the functions of the flow route setting unit 100 according to the first exemplary embodiment of the present invention, the flow route setting unit 101 has a function of sending an end check information setting message to the flow end determination unit 121 when determining a flow forwarding route. The flow route setting unit 101 creates the end check information setting message by including at least an instruction code representing the end check information setting message, a flow identifier, and a group of end check apparatus identifiers or forwarding route information. While the end check apparatuses are determined depending on a service end determination method, the apparatuses are packet forwarding apparatuses that need to notify the flow end determination unit 121 of a flow end necessary for an end determination. For example, if a flow end is determined by both ends of a flow forwarding route, packet forwarding apparatuses located at both ends of the forwarding route becomes the end check apparatuses.

The forwarding route storage unit 111 is accessed by the flow route setting unit 101 and refers, stores, and deletes flow forwarding routes.

The flow end determination unit 121 is different from the flow end determination unit 120 according to the first exemplary embodiment of the present invention in the operation of the service end determination process.

Upon receiving an end check information setting message including a group (set) of end check apparatuses from the flow route setting unit 101, the flow end determination unit 121 associates the end check apparatuses with a flow identifier and stores the group of end check apparatuses in the flow end information storage unit 130 as check items. If the end check information setting message includes forwarding route information, the flow end determination unit 121 calculates end check apparatuses from the forwarding route information and stores the end check apparatuses as check items.

Upon receiving a flow end notification message from the flow end check unit 220, the flow end determination unit 121 executes a flow end determination. Upon receiving a flow end notification message, the flow end determination unit 121 refers to the check items of a corresponding flow stored in the flow end information storage unit 130 and makes a flow end notification reception mark on the check item corresponding to the packet forwarding apparatus that has sent the flow end notification message. When all the end check apparatuses have detected a flow end, all of the check items of the corresponding flow are marked. In this way, the flow end determination unit 121 determines a flow end.

It is also preferable that, in conformity with the determination procedure as described above, the storage method of the flow end information storage unit 130 be changed to a method using a mark system to facilitate storage.

If the flow end determination unit 121 determines a service end, to delete the flow forwarding route, the flow end determination unit 121 sends a flow end notification message to the flow route setting unit 101. In addition, to delete the service provider server information, the flow end determination unit 121 sends a process end notification message to the load distribution destination determination unit 300. The flow end determination unit 121 creates the process end notification message by including at least an instruction code representing the process end notification message and a flow identifier (or an entry identifier). Finally, the flow end determination unit 121 deletes the flow end information about the corresponding flow from the flow end information storage unit 130.

Figure 4:
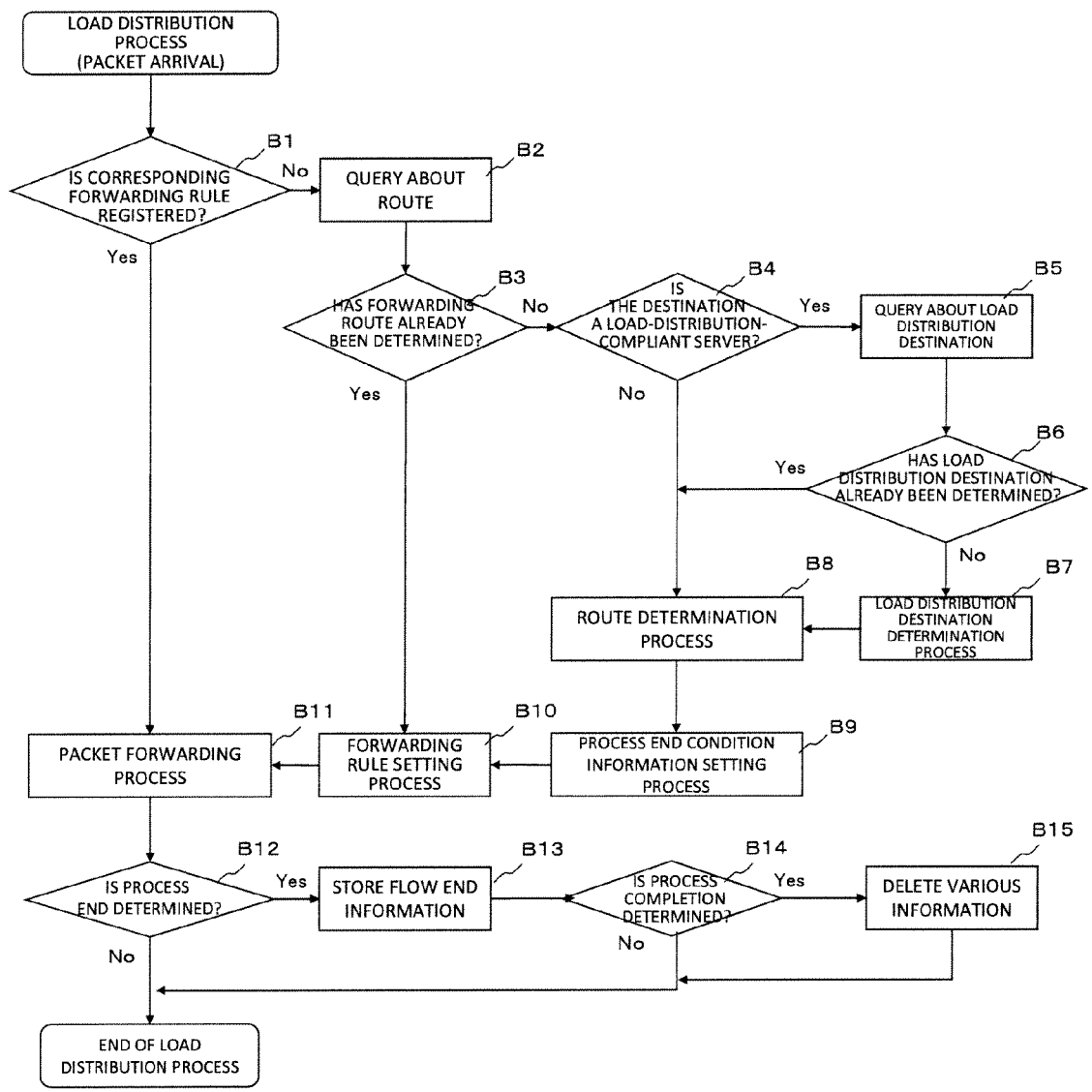
FIG. 4 is a flow chart illustrating an operation of the second exemplary embodiment of the present invention.

Next, an operation of the present exemplary embodiment will be described in detail with reference to the drawings. FIG. 4 is a flow chart illustrating an operation of the second exemplary embodiment of the present invention. An overall operation is also similar to that of the above first exemplary embodiment. Steps A1 to A8, A9 to A11, and A14 in FIG. 2 according to the first exemplary embodiment are the same as step B1 to B8, B10 to B12, and B15 in FIG. 4. Hereinafter, the description will be made with a focus on steps B9, B13, and B14, that is, on the difference from the first exemplary embodiment.

First, a phase of creating and registering end check information for a service end determination is added. After determining a forwarding route (step B8), the flow route setting unit 101 creates an end check information setting message and sends the message to the flow end determination unit 121. The flow end determination unit 121 extracts or calculates check items and stores the check items in the flow end information storage unit 130 (step B9).

In addition, in the present exemplary embodiment, since the method of determining a service end is changed to a mark system, the flow end determination unit 121 refers to the flow end notification message and makes an end information reception mark on the flow end check item which corresponds to the packet forwarding apparatus 20 that has sent the flow end notification message and which is stored in the flow end information storage unit 130 (step B13). The flow end determination unit 121 examines end information reception marks on end check items. The flow end determination unit 121 determines a service end if all the flow end check items are marked (step B14).

The load distribution process is realized through the above processes, and meritorious effects identical to those according to the first exemplary embodiment are obtained.

Third Exemplary Embodiment

Figure 5:
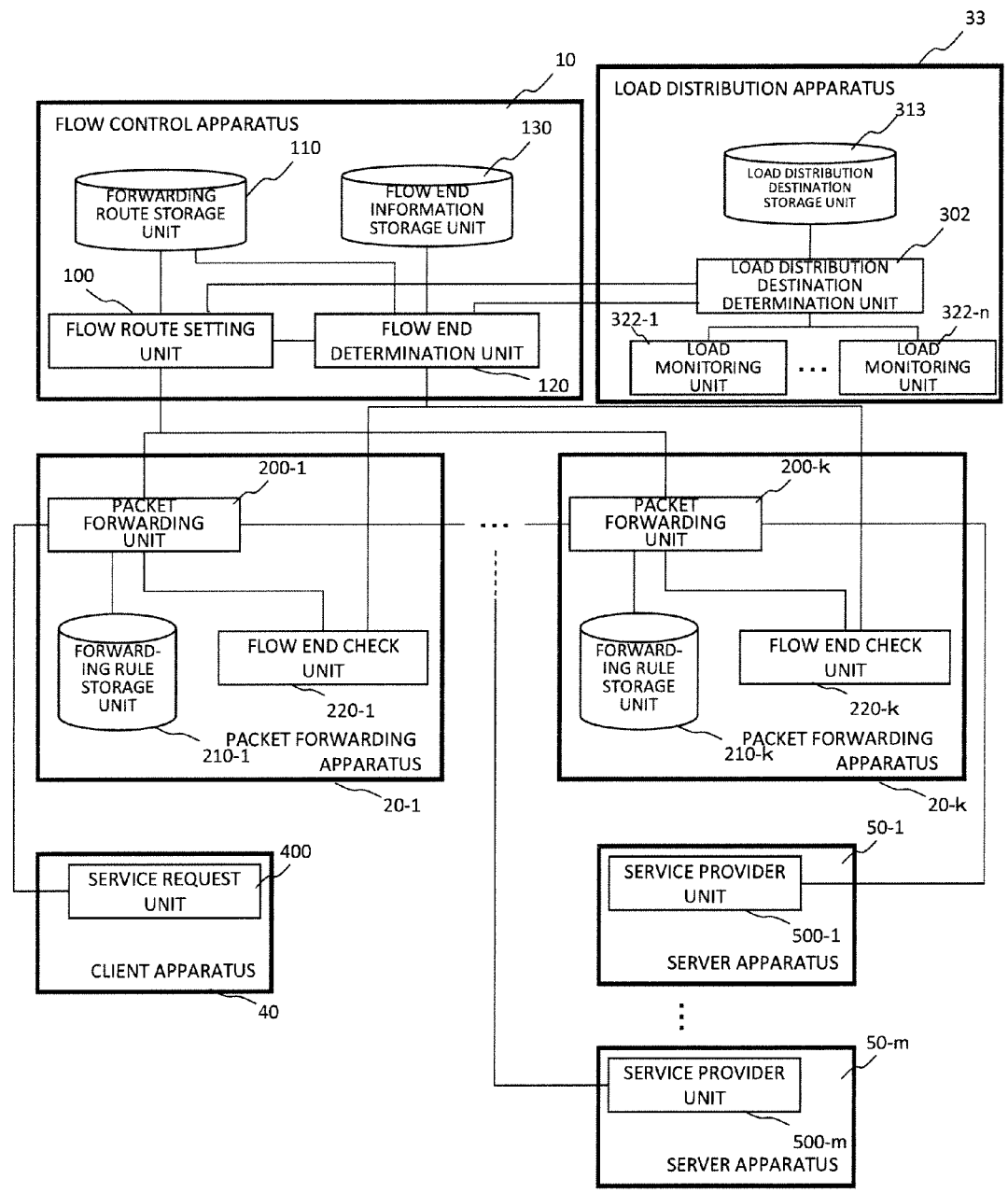
FIG. 5 is a block diagram illustrating a configuration of a third exemplary embodiment of the present invention.

Next, a third exemplary embodiment of the present invention will be described in detail with reference to the drawings. FIG. 5 is a block diagram illustrating a configuration of the third exemplary embodiment of the present invention. In FIG. 5, a load distribution system according to the third exemplary embodiment of the present invention is the same as that according to the first exemplary embodiment in that the load distribution system includes the flow control apparatus 10, the packet forwarding apparatuses 20-1 to 20-k, and the load distribution apparatus 33. The individual units also have substantially identical configurations, while the load distribution apparatus 33 has a different configuration.

In the present exemplary embodiment, load monitoring units 322 are additionally included in the load distribution apparatus 33. This configuration is to monitor load and to reflect actual load information when a load distribution destination is determined. A configuration of the present exemplary embodiment will be hereinafter described with a focus on the difference from the first exemplary embodiment of the present invention.

Each of the load monitoring units 322 monitors a predetermined index (hereinafter, referred to as "load information") among load of the individual calculator resources, packet forwarding apparatus resources, calculators, and packet forwarding apparatuses. The index is used to determine a service provider. In the present exemplary embodiment, as illustrated in FIG. 5, the number of the load monitoring units 322 is n (n is an arbitrary integer of 1 or more).

As in the first exemplary embodiment, upon receiving a destination determination request message from the flow route setting unit 100, the load distribution destination determination unit 302 checks the load distribution destination storage unit 313 to check whether a predetermined load distribution destination exists. If such load distribution destination exists in the load distribution destination storage unit 313, the load distribution destination determination unit 302 sends a load distribution destination notification message to the flow route setting unit 100 as the destination.

If such load distribution destination does not exist in the load distribution destination storage unit 313, the load distribution destination determination unit 302 acquires load information necessary to determine a service provider from the load monitoring units 322 and determines a single service provider server in accordance with a load distribution algorithm. An existing algorithm that uses load information about calculator resources and the like can be used as the load distribution algorithm. For example, a server with the lowest CPU utilization may be selected. Alternatively, a server with the fewest number of established sessions may be selected. The load distribution destination determination unit 302 stores the service provider server determined in accordance with the above algorithm in the load distribution destination storage unit 313 as the load distribution destination. The information to be stored includes a flow identifier (or an entry identifier) and a destination server identifier. The load distribution destination determination unit 302 sends a load distribution destination notification message representing the service provider server determined in accordance with the load distribution algorithm as the destination to the flow route setting unit 100. In addition, the load distribution destination determination unit 302 can update the load information in the load monitoring units 322. Updating of the load information will be described later with the load monitoring units 322.

Upon receiving a process end notification message from the flow end determination unit 120, the load distribution destination determination unit 302 deletes the load distribution destination of the corresponding flow from the load distribution destination storage unit 313. In addition, the load distribution destination determination unit 302 can update the load information in the load monitoring units 322.

Each of the load monitoring units 322 monitors a predetermined index (hereinafter, referred to as "load information") among load of the individual calculator resources, packet forwarding apparatus resources, calculators, and packet forwarding apparatuses. The index is used to determine a service provider. Further, other examples of the load information include the CPU utilization, the session number, and the ratio of the current session number to the maximum session number. Information acquired in a constant period as a monitoring period may be used as the load information. Alternatively, a statistical value, such as an average value of a certain number of acquired information pieces may be used as the load information.

In addition, the load monitoring units 322 may cooperate with the load distribution destination determination unit 302 and hold the number of sessions or the number of services allocated. If such load information is used, since the load monitoring units 322 can calculate the load information in response to a load information update request from the load distribution destination determination unit 302, the need for monitoring certain apparatuses is eliminated. Namely, when the load distribution destination determination unit 302 determines a load distribution destination, the load monitoring units 322 may increase, as load information, the number of services allocated in the corresponding server or the like. When the load distribution destination determination unit 302 deletes a load distribution destination, the load monitoring units 322 decrease, as load information, the number of services allocated in the corresponding server or the like.

Upon receiving a request from the load distribution destination determination unit 302 to provide load information, the load monitoring units 322 send load information.

An operation of the third exemplary embodiment can be described with reference to the flow chart in FIG. 2 illustrating the operation of the first exemplary embodiment. Namely, processes according to the third exemplary embodiment are the same as those according to the first exemplary embodiment, except that the load distribution destination determination unit 302 uses a load distribution algorithm using load information in the load distribution destination determination process in step A7 in FIG. 2.

According to the third exemplary embodiment of the present invention as described above, in addition to the meritorious effects provided by the first exemplary embodiment, load can be distributed by using load information about the individual calculator resources, forwarding apparatus resources, calculators, or forwarding apparatuses. Thus, load distribution suitable to more realistic calculator environments is made possible. This is because a load distribution destination can be determined in view of load information acquired from the load monitoring units 322.

Fourth Exemplary Embodiment

Figure 6:
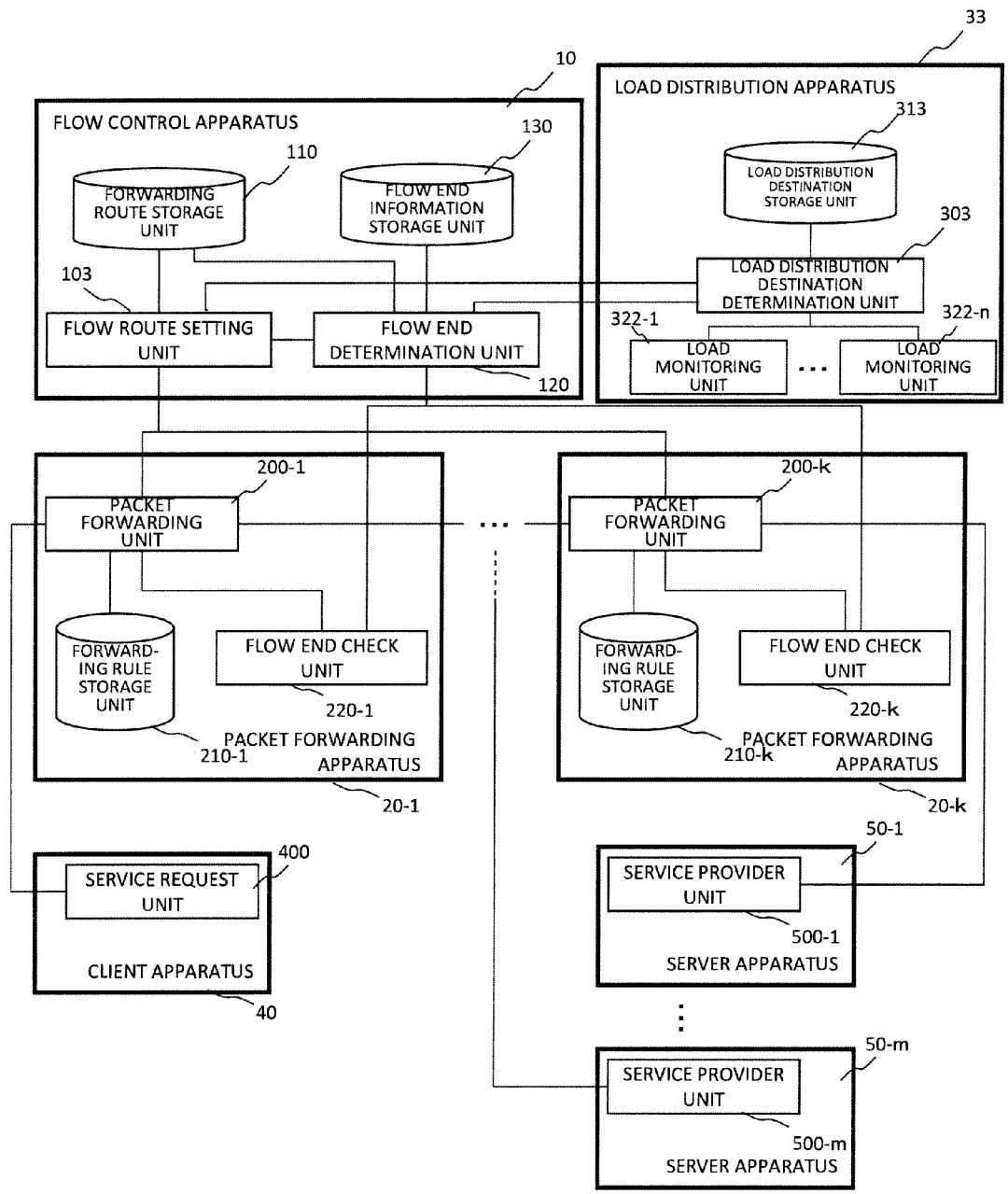
FIG. 6 is a block diagram illustrating a configuration of a fourth exemplary embodiment of the present invention.

Next, a fourth exemplary embodiment of the present invention will be described in detail with reference to the drawings. FIG. 6 is a block diagram illustrating a configuration of the fourth exemplary embodiment of the present invention. In FIG. 5, a load distribution system according to the fourth exemplary embodiment of the present invention is the same as that according to the third exemplary embodiment in that the load distribution system includes the flow control apparatus 10, the packet forwarding apparatuses 20-1 to 20-k, and the load distribution apparatus 33. The individual units also have substantially identical configurations, while the flow route setting unit 103 and the load distribution destination determination unit 303 include different functions.

The present configuration is used to determine a load distribution destination in view of not only the load information grasped by the load distribution apparatus but also an index used to determine a route by the flow control apparatus. The configuration of the present exemplary embodiment will be hereinafter described with a focus on the difference from the third exemplary embodiment of the present invention.

In addition to the functions of the flow route setting unit 100 according to the above first exemplary embodiment, the flow route setting unit 103 has the following functions.

The flow route setting unit 103 allows the load distribution destination determination unit 303 to include a plurality of load distribution destinations in a load distribution destination notification message sent therefrom. Namely, the flow route setting unit 103 allows a plurality of candidate servers to be presented as load distribution destinations. The flow route setting unit 103 determines a forwarding route based on a plurality of candidate servers. As in the flow route setting unit 100 according to the first exemplary embodiment, to determine a route, the flow route setting unit 103 can use an algorithm such as Dijkstra's algorithm determining an optimum route. When a forwarding route is determined in this way, a single service provider server is determined from among the candidate servers.

If a load distribution destination notification message sent from the load distribution destination determination unit 303 includes a plurality of load distribution destinations, to register the load distribution destination server determined through the above forwarding route determination as the load distribution destination, the flow route setting unit 103 sends a destination determination message to the load distribution destination determination unit 303. The flow route setting unit 103 creates the destination determination message by including at least an instruction code representing the destination determination message, a flow identifier (or an entry identifier), and a destination identifier.

The load distribution destination determination unit 303 determines a service provider server for load distribution. More specifically, upon receiving a destination determination request message from the flow route setting unit 103, the load distribution destination determination unit 303 checks the load distribution destination storage unit 313 to check whether a predetermined load distribution destination exists. If such load distribution destination exists in the load distribution destination storage unit 313, the load distribution destination determination unit 303 sends a load distribution destination notification message to the flow route setting unit 103 as the destination.

If such load distribution destination does not exist in the load distribution destination storage unit 313, the load distribution destination determination unit 303 determines a single service provider server in accordance with a load distribution algorithm. An existing algorithm using load information about various calculator resources described as an example in the third exemplary embodiment can be used as the load distribution algorithm. For example, a server with the lowest CPU utilization may be selected. Alternatively, a server with the fewest number of established sessions may be selected. The load distribution destination determination unit 303 according to the present exemplary embodiment does not always need to determine a single load distribution destination server. A plurality of servers may be selected depending on conditions. The load distribution destination determination unit 303 stores the service provider server determined in accordance with the load distribution algorithm in the load distribution destination storage unit 310 as the load distribution destination for the flow. The load distribution destination determination unit 303 sends a load distribution destination notification message including the service provider server determined in accordance with the load distribution algorithm to the flow route setting unit 103.

In addition, upon receiving a destination determination message from the flow route setting unit 103, the load distribution destination determination unit 303 replaces information about the service provider servers that are selected by the load distribution destination determination unit 303 and that are stored in the load distribution destination storage unit 313 with the uniquely determined service provider server included in the destination determination message.

In addition, upon receiving a process end notification message from the flow end determination unit 120, the load distribution destination determination unit 303 deletes the load distribution destination of the corresponding flow from the load distribution destination storage unit 313.

Figure 7:
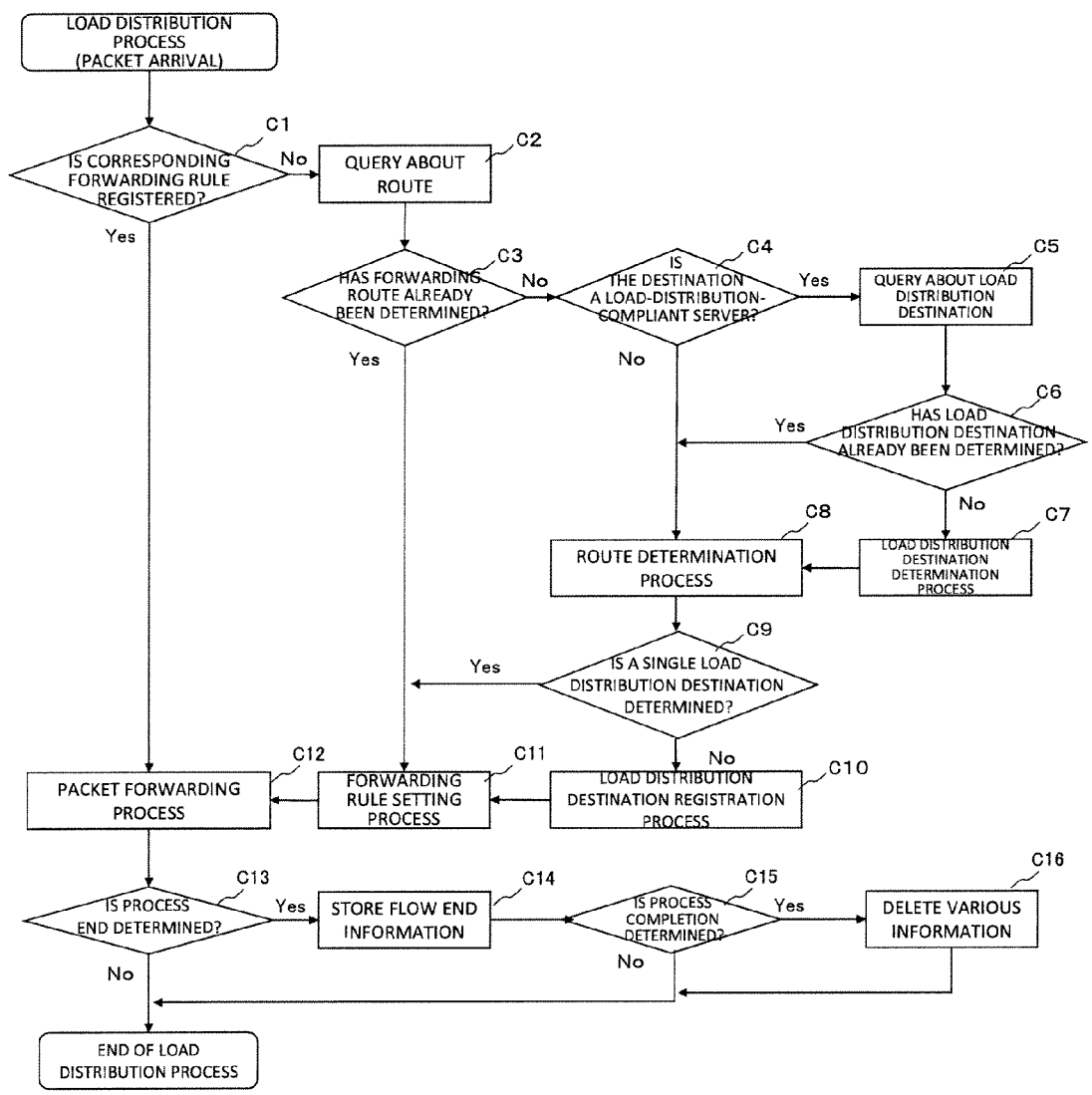
FIG. 7 is a flow chart illustrating an operation of the fourth exemplary embodiment of the present invention.

Next, an operation of the present exemplary embodiment will be described in detail with reference to the drawings. FIG. 7 is a flow chart illustrating an operation of the fourth exemplary embodiment of the present invention. An overall operation is also similar to that according to the above first exemplary embodiment, and steps A1 to A6 and A9 to A14 in FIG. 2 according to the first exemplary embodiment are the same as steps C1 to C6 and steps C11 to C16 in FIG. 7. Hereinafter, the description will be made with a focus on steps C7 to C10, that is, on the difference from the first exemplary embodiment.

If a load distribution destination is not determined in step C6, in accordance with a load distribution algorithm, the load distribution destination determination unit 303 acquires load information from the load monitoring units 322 and determines a load distribution destination candidate. The determined destination candidate is stored in the load distribution destination storage unit 313. In addition, the load distribution destination determination unit 303 creates a load distribution destination candidate notification message including the determined destination candidate, sends the message to the flow route setting unit 103, and causes the flow route setting unit 103 to start a route determination process (step C7).

Next, whether or not the destination is a load-distribution-compliant server, since a service provider server candidate is determined, the flow route setting unit 103 determines a forwarding route in accordance with a route setting algorithm (step C8).

Next, the flow route setting unit 103 determines whether a single service provider server candidate is represented in the load distribution destination candidate notification message (step C9).

If a plurality of candidates are represented (No in step C9), the flow route setting unit 103 needs to execute updating by using information about the single service provider server determined in the route setting process. Thus, the flow route setting unit 103 sends a destination determination message representing that the load distribution destination server determined through the forwarding route determination process is the load distribution destination to the load distribution destination determination unit 303. The load distribution destination determination unit 303 updates the load distribution destination servers stored in the load distribution destination storage unit 313, based on the destination determination message (step C10).

According to the above fourth exemplary embodiment of the present invention, in addition to the meritorious effects provided by the above first and third exemplary embodiments, a meritorious effect of realizing load distribution in view of a network configuration, network load, a forwarding route allocation index (or principle), and the like is provided. This is because, instead of selecting a single server from servers satisfying service provision conditions, service provider server candidates are first determined based on a load distribution algorithm. Next, a network configuration and the like are reflected by using a route setting algorithm to finally determine a load distribution destination.

In addition, according to the fourth exemplary embodiment, since separation of apparatus functions can be realized more clearly, the load distribution system can be implemented more easily, counted as an advantage. For example, the fourth exemplary embodiment can realize such functional separation where the load distribution apparatus executes a determination in view of only the load of an apparatus such as a server apparatus or a switch apparatus and the flow control apparatus handles only the network-related processes. This is because network optimization can be designed by the route setting algorithm alone.

Specific Example 1

Next, operations of the individual apparatuses of the present invention will be described in more detail based on a specific example of the present invention. Hereinafter, the description will be made based on the configuration according to the above fourth exemplary embodiment.

Figure 8:
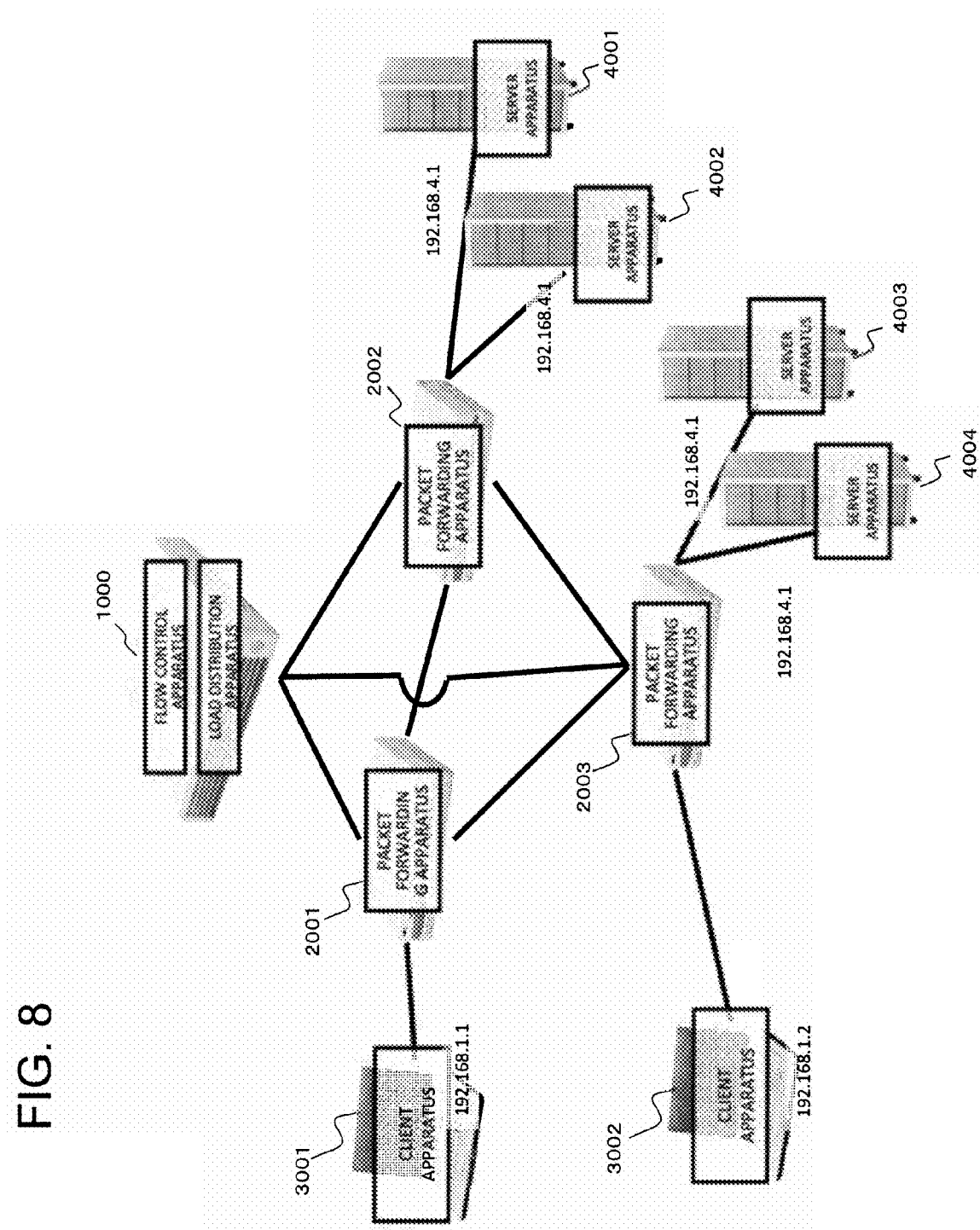
FIG. 8 illustrates a configuration used to illustrate specific operations of the present invention.

FIG. 8 illustrates a configuration used to illustrate a specific operation of the present invention. In FIG. 8, a calculator (hereinafter, "controller apparatus") 1000 serves as a controller. The flow control apparatus 10 and the load distribution apparatus 33 according to the fourth exemplary embodiment are mounted in the controller apparatus 1000. Each of the apparatuses may be implemented as a program.

Each of the HUBs 2001 to 2003 is a HUB in which the packet forwarding apparatus 20 according to the above exemplary embodiments is mounted. These HUBs connect calculators or switches. In this example, the three HUBs 2001 to 2003 correspond to the packet forwarding apparatuses 20-1 to 20-$k$ according to the above exemplary embodiments.

A client apparatus 3001 is a personal computer or the like and corresponds to the client apparatus 40 according to the fourth exemplary embodiment. In the example in FIG. 8, to facilitate understanding of meritorious effects, two client apparatuses 3001 and 3002 are illustrated.

Server apparatuses 4001 to 4004 are Web servers, application servers, or the like and correspond to the server apparatuses 50 according to the fourth exemplary embodiment. In the example in FIG. 8, each of these four server apparatuses 4001 to 4004 can be used as a load distribution destination.

Next, implementation examples of the units in the apparatuses in FIG. 8 will be described.

The flow route setting unit 103 of the controller apparatus 1000 uses Dijkstra's algorithm to determine a route. As an evaluation index for the determination, the number of hops (the number of forwarding times) is used. To clarify meritorious effects in route setting, the HUBs, the server apparatuses, and the client apparatus are processed in a search queue in ascending order with the smallest apparatus number first.

In this example, when determining a distribution destination, the load distribution destination determination unit 303 of the controller apparatus 1000 selects a server apparatus to which the fewest number of flows is allocated. If the same number of flows is allocated to a plurality of server apparatuses, the group of server apparatuses is determined to be distribution destinations.

The load monitoring units 322 of the controller apparatus 1000 monitor the number of server flows in the respective server apparatuses. The number of server flows can be obtained by the number of determinations as a distribution destination and the number of end flows, without querying the actual server terminals 4001 to 4004. However, in the following description, the load monitoring units 322 monitor the number of flows in the respective server apparatuses by monitoring the CPU utilization or the like and querying the respective server apparatuses.

In addition, while the load monitoring units 322 are directly connected to the server apparatuses 50 in the above fourth exemplary embodiment, as illustrated in the example in FIG. 8, the load monitoring units 322 can be implemented to receive monitoring information via the HUB apparatuses. In the example in FIG. 8, packet forwarding information (forwarding rule) for this implementation is set in advance in each of the HUBs. In addition, generally, the monitoring is regularly executed as background processing.

The flow end check units 220 of the HUBs 2001 to 2003 determine an end when a 4-way handshake using a TCP FIN flag is checked. While a 4-way handshake is used in practice, the following description and illustration will be made based on a 3-way handshake, as in the case of a SYN packet, since an ACK reply and a subsequent FIN request from a server can be implemented in a single packet.

The flow end determination unit 120 of the controller apparatus 1000 determines a service end when HUBs at both ends of a route detect a flow end.

Next, specific representation of identifiers and messages used in the following description will be described. In the following description, load-distribution-compliant services are provision of Web pages using the TCP. For such service, the entrance port of the HTTP is port number 80.

A flow identifier is represented by a combination of an IP source and an IP destination as "<source, destination>". Namely, a packet from 192.168.1.1 to 192.168.4.1 is represented by "<192.168.1.1, 192.168.4.1>". In addition, to distinguish each service, namely, each acquisition of a series of Web pages and to represent each service provision, a TCP port number of a source is represented as "192.168.4.1:80" as needed in the following description. In addition, as is the case with the above, in the following description, the end of a service is determined when the end of a flow is determined. Thus, a flow identifier also signifies a service identifier.

FIG. 9 is a list of messages used in the following description. Each of the messages is represented by a combination of "[instruction code, data]".

A forwarding route is represented by apparatus names divided by a hyphen (-). A client apparatus and a server apparatus are represented by "Cli" and "Serv," respectively. A forwarding rule is represented by "[flow identifier, operation]", and a forwarding operation to an apparatus is represented by "Forward apparatus name". Namely, a forwarding operation to the client apparatus 3001 is represented by "Forward Cli3001".

Figure 10:
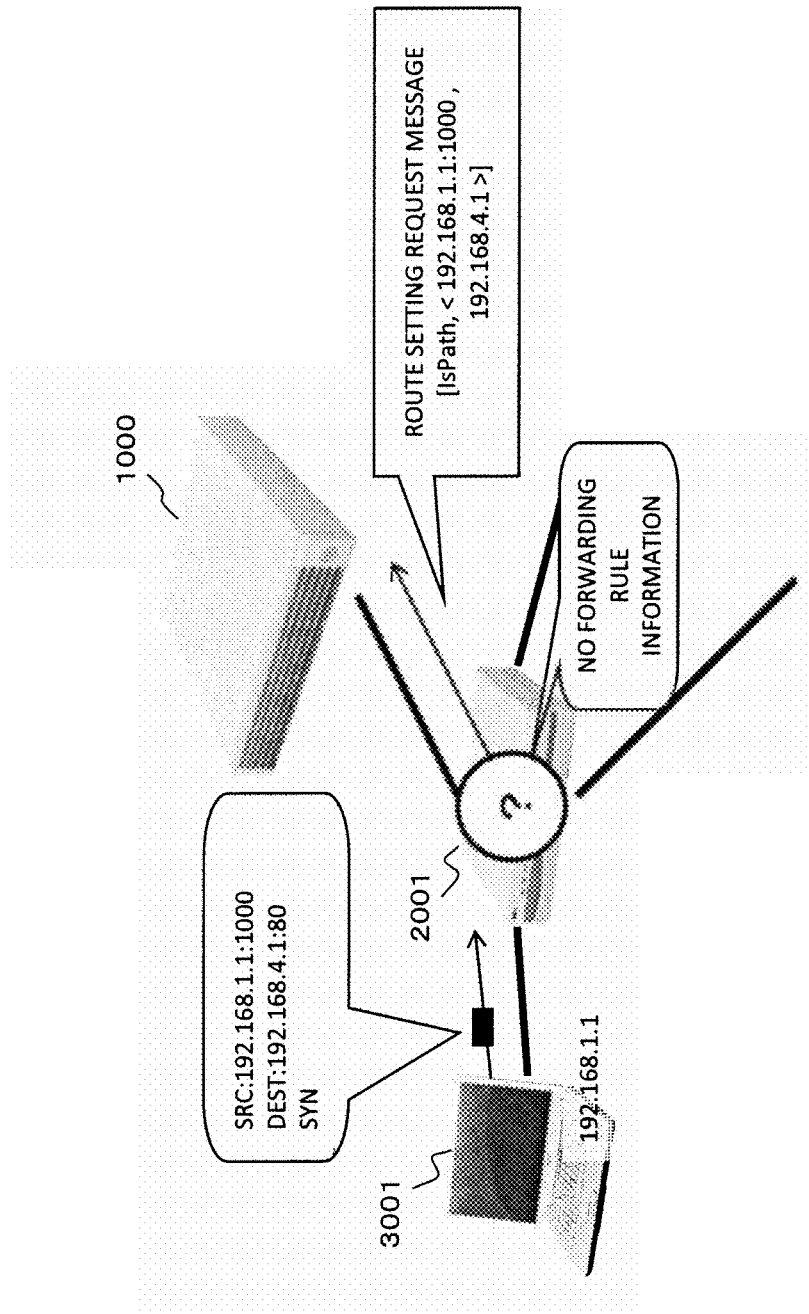
FIG. 10 illustrates an operation of a packet forwarding apparatus that has received a new packet from a client apparatus in FIG. 8.

FIG. 10 illustrates an operation of the HUB 2001 (packet forwarding apparatus) that has received a new packet from the client apparatus 3001. As illustrated in FIG. 10, when the client apparatus 3001 sends a packet to a server apparatus to request a service, a SYN packet of the TCP arrives at the HUB 2001. Assuming that the packet is outputted from the port number 1000 of the requesting client, the flow identifier represents <192.168.1.1:1000, 192.168.4.1>.

The packet forwarding unit 200-1 in the HUB 2001 refers to the forwarding rule storage unit 210-1 about the flow identifier representing <192.168:1.1:1000, 192.168.4.1>. However, since the flow identifier is not stored (No in step C1 in FIG. 7), the packet forwarding unit 200-1 sends a route setting request message [IsPath, <192.168.1.1:1000, 192.168.4.1>] to the flow route setting unit 103 of the controller apparatus 1000 (step C2 in FIG. 7).

Figure 11:
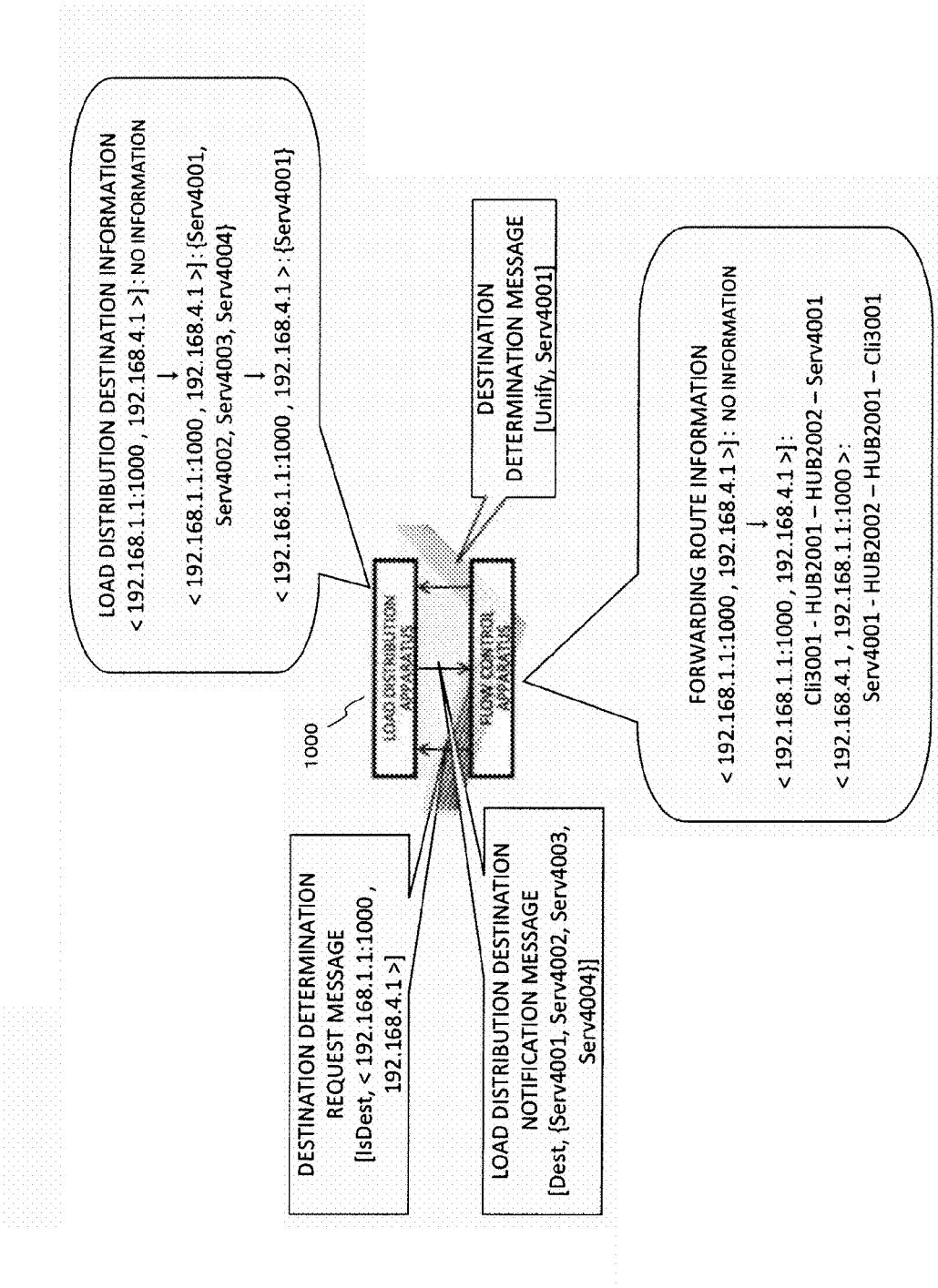
FIG. 11 illustrates operations that are subsequent to FIG. 10 and that are executed by a controller apparatus.

FIG. 11 illustrates operations of the controller apparatus 1000 that has received the route setting request message. As illustrated in FIG. 11, the flow route setting unit 103 refers to the forwarding route storage unit 110, since no forwarding route information corresponding to the flow identifier <192.168.1.1:1000, 192.168.4.1> exists (No in step C3 in FIG. 7), the flow route setting unit 103 checks the destination information 192.168.4.1 and recognizes that the destination is a load-distribution-compliant server (Yes in step C4 in FIG. 7). Next, the flow route setting unit 103 sends a destination determination request message [IsDest, <192.168.1.1:1000, 192.168.4.1>] to the load distribution destination determination unit 303 (see the top-left box in FIG. 11 and step C5 in FIG. 7).

The load distribution destination determination unit 303 refers to the load distribution destination storage unit 310 to determine whether a flow corresponding to the flow identifier <192.168.1.1:1000, 192.168.4.1> exists. Since such flow does not exist (No in step C6 in FIG. 7), the load distribution determination process is started. First, the load distribution destination determination unit 303 acquires load information about the compliant server apparatuses 4001 to 4004 having the destination identifier 192.168.4.1 from the load monitoring units 322. Assuming that all the server apparatuses are in an initial state, the number of flows is 0 in all the server apparatuses. Thus, all the server apparatuses are selected as load distribution destination candidates. The load distribution destination determination unit 303 stores information about the group of all the server apparatuses, that is, {Serv4001, Serv4002, Serv4003, Serv4004}, in the load distribution destination storage unit 313 by using the flow identifier <192.168.1.1:1000, 192.168.4.1> as a key. Next, the load distribution destination determination unit 303 sends a load distribution destination notification message [Dent, {Serv4001, Serv4002, Serv4003, Serv4004}] to the flow route setting unit 103 (see the bottom left box in FIG. 11 and step C7 in FIG. 7).

The flow route setting unit 103 searches for a route in accordance with Dijkstra's algorithm, based on the received load distribution destination notification message. First, the search starts with the client apparatus 3001 as follows: {Cli3001:0}→{HUB2001:1|Cli3001:0}→{HUB2002:2, HUB2003:2|Cli3001:0, HUB2001:1}→{HUB2003:2, Serv4001:3, Serv4002:3|Cli3001:0, HUB2001:1, HUB2002:2}→{Serv4001:3, Serv4002:3, Serv4001:3, Serv4002:3|Cli3001:0, HUB2001:1, HUB2002:2, HUB2003:2}. Through this search, it is determined that the packet first arrives at the Serv 4001 on a forwarding route Cli 3001-HUB 2001-HUB 2002-Serv 4001 (see the bottom box in FIG. 11). In addition, the reverse flow, namely, a route from 192.168.4.1 to 192.168.1.1:1000, is determined to be Serv 4001-HUB 2002-HUB 2001-Cli 3001 (see the bottom box in FIG. 11).

The flow route setting unit 103 stores these forwarding routes in the forwarding route storage unit 110 by using the respective flow identifiers <192.168.1.1:1000, 192.168.4.1>, <192.168.4.1, 192.168.1.1:1000> as keys (step C8 in FIG. 7).

Since a plurality of load distribution destination candidates are presented (No in step C9 in FIG. 7), the flow route setting unit 103 sends a destination determination message [Unify, Serv4001] to the load distribution destination determination unit 303 (see the middle right box in FIG. 11). Upon receiving the destination determination message [Unify, Serv4001], the load distribution destination determination unit 303 causes the load distribution destination storage unit 313 to update a value, that is, the load distribution destination, to {Serv4001} by using the flow identifier <192.168.1.1:1000, 192.168.4.1> as a key (step C10 in FIG. 7).

Figure 12:
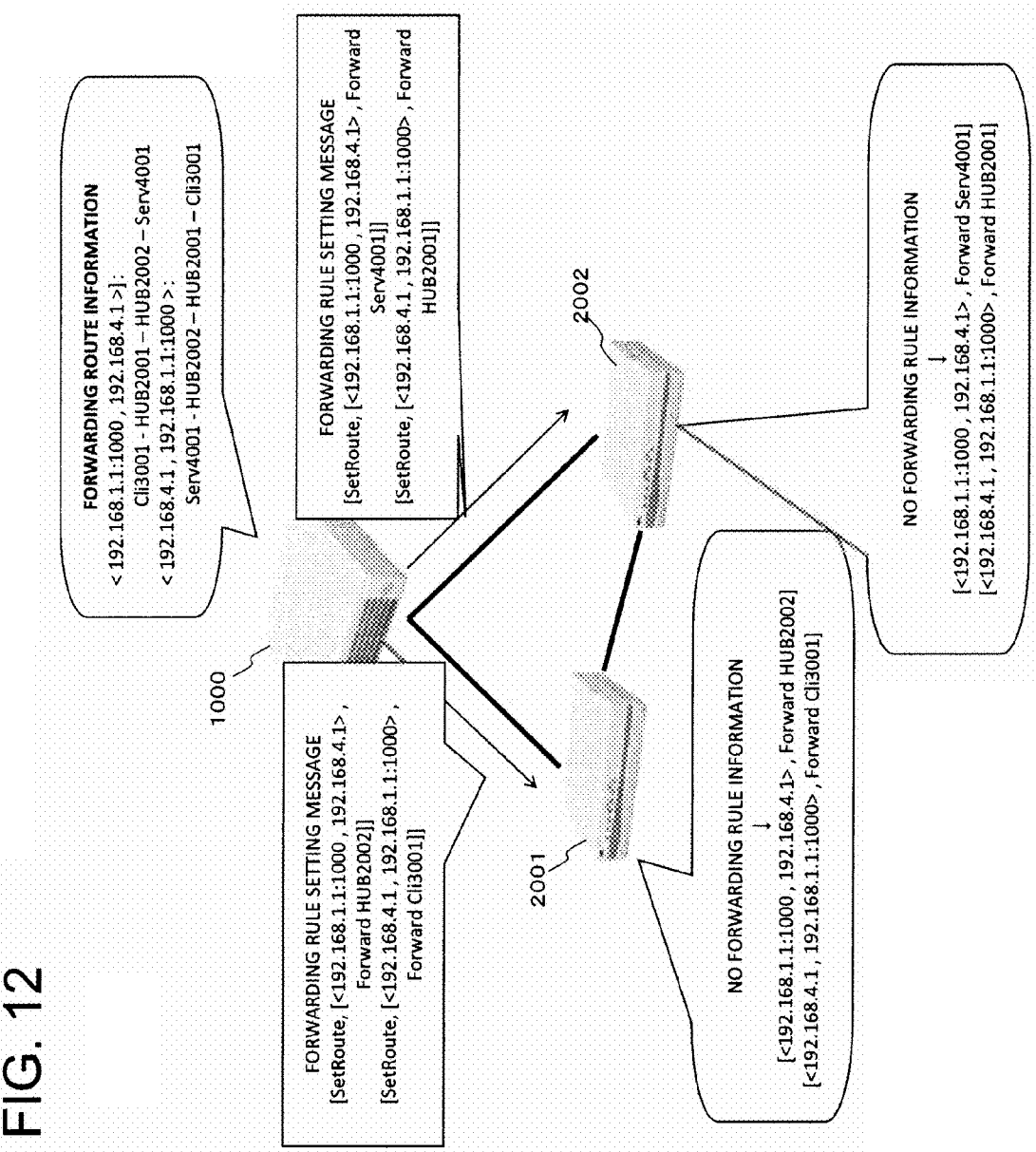
FIG. 12 illustrates operations that are subsequent to FIG. 11 and that are executed by the controller apparatus and packet forwarding apparatuses.

FIG. 12 illustrates an operation of setting the above determined forwarding route in each of the HUBs by the controller apparatus 1000. As illustrated in FIG. 12, the flow route setting unit 103 converts the determined forwarding route into a forwarding rule and sends the forwarding rule to each of the relay packet forwarding units 200. First, since the flow having the flow identifier <192.168.1.1:1000, 192.168.4.1> runs on the forwarding route Cli 3001-HUB 2001-HUB 2002-Serv 4001, the relay HUBs are the HUB 2001 and HUB 2002. Thus, the forwarding rule sent to the HUB 2001 represents [<192.168.1.1:1000, 192.168.4.1>, Forward HUB2002] and the forwarding rule sent to the HUB 2002 represents [<192.168.1.1:1000, 192.168.4.1>, Forward Serv4001].

Similarly, for the reverse flow, the forwarding rule sent to the HUB 2001 represents [<192.168.4.1, 192.168.1.1:1000>, Forward Cli3001] and the forwarding rule sent to the HUB 2002 represents [<192.168.4.1, 192.168.1.1:1000>, Forward HUB2001].

To set these forwarding rules, the flow route setting unit 103 sends a forwarding rule setting message representing [SetRoute, [<192.168.1.1:1000, 192.168.4.1>, Forward HUB2002]] and [SetRoute, [<192.168.4.1, 192.168.1.1:1000>, Forward Cli3001]] to the packet forwarding unit 2001-1 and a forwarding rule setting message representing [SetRoute, [<192.168.1.1:1000, 192.168.4.1>, Forward Serv4001]] and [SetRoute, [<192.168.4.1, 192.168.1.1:1000>, Forward HUB2001]] to the packet forwarding unit 200-2, respectively.

The packet forwarding unit 200-1 refers to the received forwarding rule setting message and stores the forwarding rules [<192.168.1.1:1000, 192.168.4.1>, Forward HUB2002] and [<192.168.4.1, 192.168.1.1:1000>, Forward Cli3001] in the forwarding rule storage unit 210-1. Likewise, the packet forwarding unit 200-2 refers to the received forwarding rule setting message and stores the forwarding rules [<192.168.1.1:1000, 192.168.4.1>, Forward Serv4001] and [<192.168.4.1, 192.168.1.1:1000>, Forward HUB2001] in the forwarding rule storage unit 210-2 (step C11 in FIG. 7).

Figure 13:
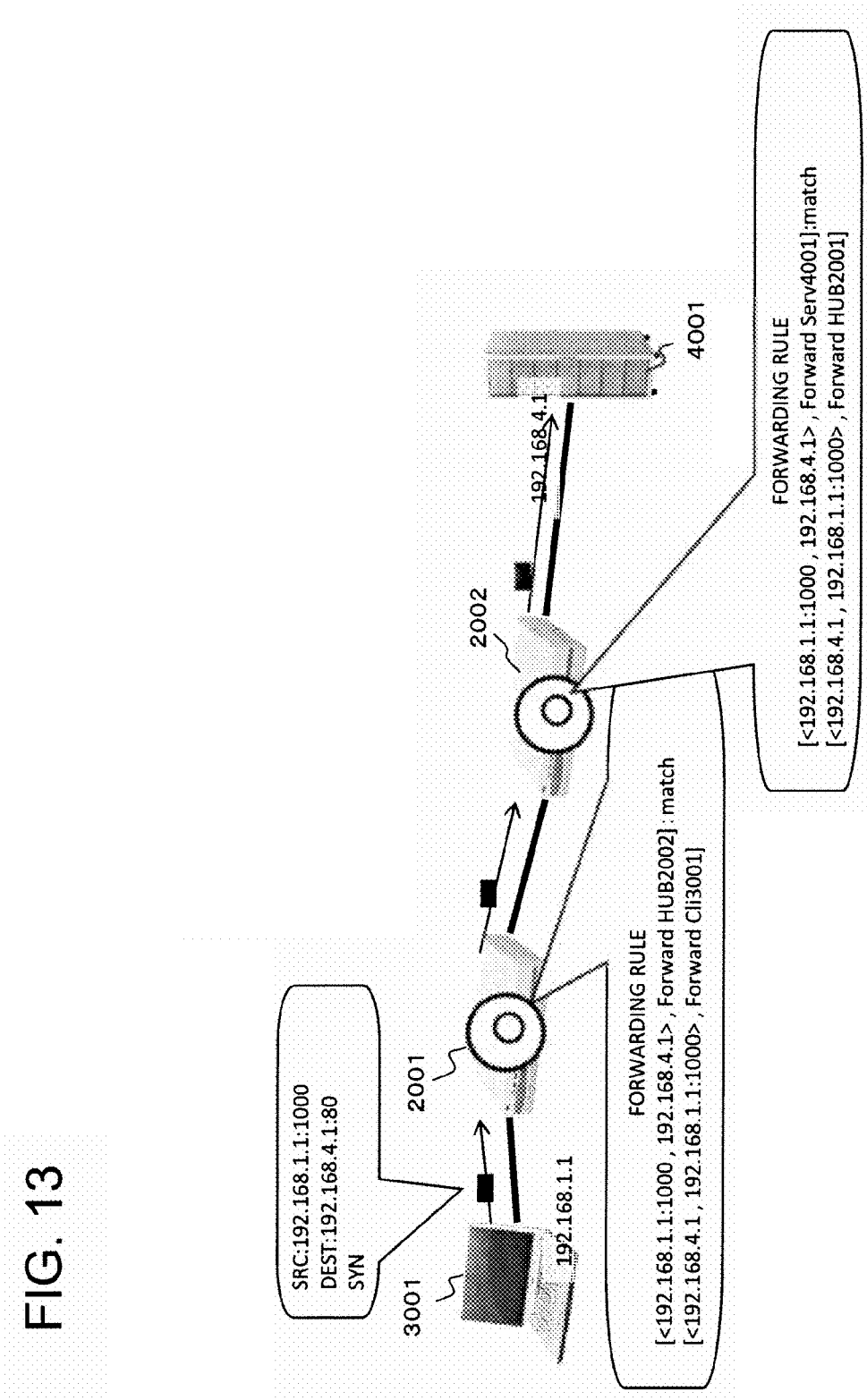
FIG. 13 illustrates operations of the packet forwarding apparatuses that have received a subsequent packet from the client apparatus in FIG. 8.

FIG. 13 illustrates operations of the HUBs 2001 and 2002 in which the above forwarding routes are set. As illustrated in FIG. 13, since the forwarding rules have been set, the packet forwarding unit 200-1 forwards the held SYN packet to the HUB 2002 in accordance with the forwarding rules. Upon receiving the SYN packet from the packet forwarding unit 200-1, the packet forwarding unit 200-2 forwards the SYN packet to the server apparatus 4001 in accordance with the set forwarding rules (step C12 in FIG. 7). In addition, since the received packet is a SYN packet, the flow end check units 220-1 and 220-2 in the HUBs 2001 and 2002, respectively, do not determine a process end. Thus, the flow end check units 220-1 and 220-2 do not send a message indicating a process end (No in step C13 in FIG. 7).

Through the above processes, the SYN packet arrives at the service provider unit 500-1 of the server apparatus 4001. Upon receiving the SYN packet, the service provider unit 500-1 starts establishing connection for service provision. Namely, the service provider unit 500-1 sends a SYN-ACK packet having a flow identifier <192.168.4.1, 192.168.1.1:1000> as a reply.

Figure 14:
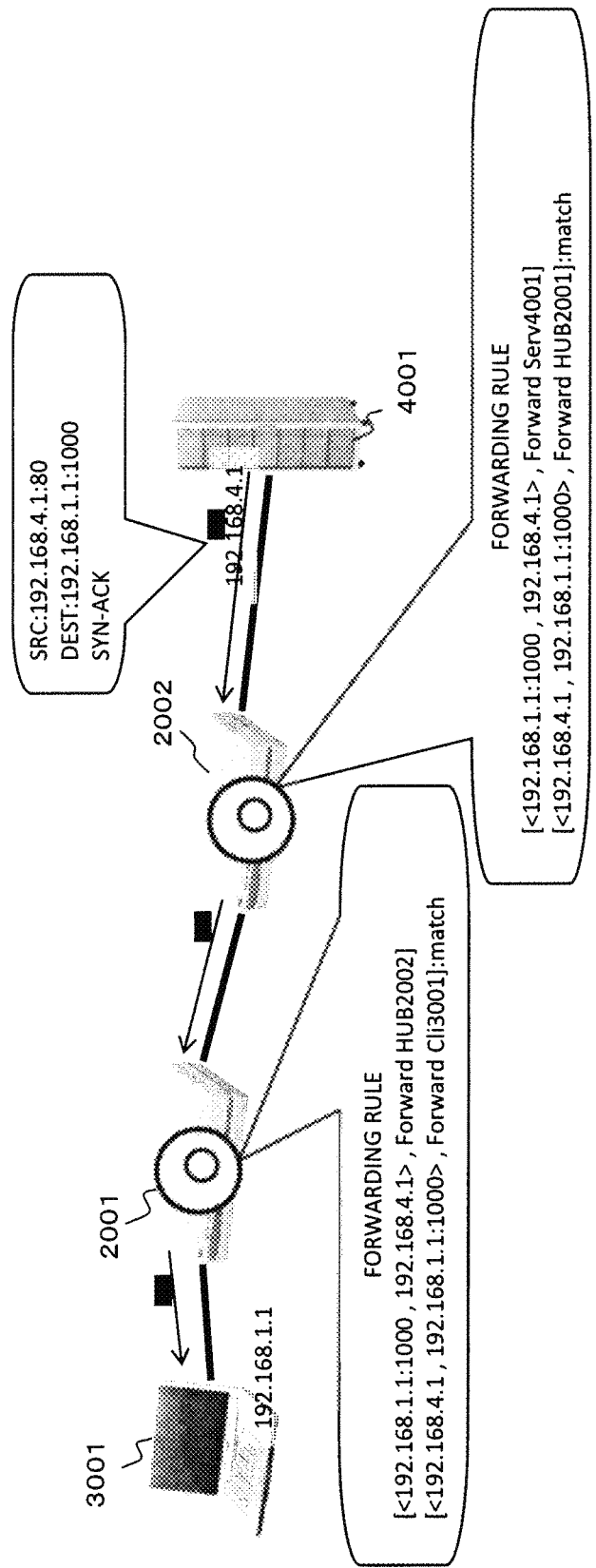
FIG. 14 illustrates operations that are subsequent to FIG. 13 and that are executed by the server apparatus and the packet forwarding apparatuses that have received the subsequent packet from the client apparatus in FIG. 8.

FIG. 14 illustrates operations subsequent to FIG. 13. FIG. 14 illustrates operations of the HUBs that have received the acknowledgment packet from the server apparatus. As illustrated in FIG. 14, since the forwarding route regarding <192.168.4.1, 192.168.1.1:1000> has already been set, the HUBs 2002 and 2001 only execute a packet forwarding process.

Subsequently, the process for the flow between the client apparatus 3001 represented by 192.168.1.1:1000 and the server apparatus 4001 continues based on the set forwarding route.

Next, if the client apparatus 3002 sends a packet to a server apparatus to request a service, load distribution is executed as follows. First, in the TCP, a SYN packet arrives at the HUB 2003 from the client apparatus 3002. Assuming that the packet is outputted from port number 1000 of the requesting client, the flow identifier represents <192.168.1.2:1000, 192.168.4.1>.

Next, from the HUB 2003, a forwarding route setting process is started. The packet forwarding unit 200-3 in the HUB 2003 refers to the forwarding rule storage unit 210-3 about the flow identifier representing <192.168.1.2:1000, 192.168.4.1>. However, since the flow identifier is not stored (No in step C1 in FIG. 7), the packet forwarding unit 200-3 sends a route setting request message [IsPath, <192.168.1.2:1000, 192.168.4.1>] to the flow route setting unit 103 of the controller apparatus 1000 (step C2 in FIG. 7).

While the flow route setting unit 103 refers to the forwarding route storage unit 110, since no forwarding route information corresponding to the flow identifier <192.168.1.2:1000, 192.168.4.1> exists (No in step C3 in FIG. 7), the flow route setting unit 103 checks the destination information 192.168.4.1 and recognizes that the destination is a load-distribution-compliant server (Yes in step C4 in FIG. 7). Next, the flow route setting unit 103 sends a destination determination request message [IsDest, <192.168.1.2:1000, 192.168.4.1>] to the load distribution destination determination unit 303 (step C5 in FIG. 7).

The load distribution destination determination unit 303 refers to the load distribution destination storage unit 313 to determine whether a flow corresponding to the flow identifier <192.168.1.2:1000, 192.168.4.1> exists. Since such flow does not exist (No in step C6 in FIG. 7), the load distribution determination process is started.

First, the load distribution destination determination unit 303 acquires load information about the compliant server apparatuses 4001 to 4004 having the destination identifier 192.168.4.1 from the load monitoring units 322. Since the flow number of the server apparatus 4001 is already 1, the server apparatus 4001 has higher load than the other server apparatuses. Thus, the server apparatuses 4002 to 4004 are selected as load distribution destination candidates. Next, the load distribution destination determination unit 303 stores information about the group of all of the server apparatuses as the load distribution destination candidates, that is, {Serv4002. Serv4003, Serv4004}, in the load distribution destination storage unit 310 by using the flow identifier <192.168.1.2:1000, 192.168.4.1> as a key. Next, the load distribution destination determination unit 303 sends a load distribution destination candidate message [Dest, {Serv4002, Serv4003, Serv4004}] to the flow route setting unit 103 (step C7 in FIG. 7).

The flow route setting unit 103 searches for a route in accordance with Dijkstra's algorithm. First, the search starts with the client apparatus 3002 as follows: {Cli3002:0}→{HUB2003:1|Cli3002:0}→{HUB2001:2, HUB2002:2, Serv4003:2, Serv4004:2|Cli3002:0, HUB2003:1}→{HUB2002:2, Serv4003:2, Serv4004:2|Cli3002:0. HUB2003:1, HUB2001:2}→{Serv4003:2, Serv4004:2, Serv4001:3, Serv4002:3|Cli3002:0, HUB2003:1, HUB2001:2, HUB2002:2}. Through this search, it is determined that the packet first arrives at the Serv 4003 on a forwarding route Cli 3002-HUB 2003-Serv 4003 (step C8 in FIG. 7).

Subsequently, as in the case of the process between the above client apparatus 3001 represented by 192.168.1.1:1000 and the server terminal 4001, whether a single load distribution destination is presented is checked, and the load distribution destination registration process, the forwarding rule setting process, and the like are executed (step C9 to C11 in FIG. 7). Next, the forwarding route is established between the client apparatus 3002 represented by 192.168.1.2:1000 and the server terminal 4003, and service provision is started.

Figure 15:
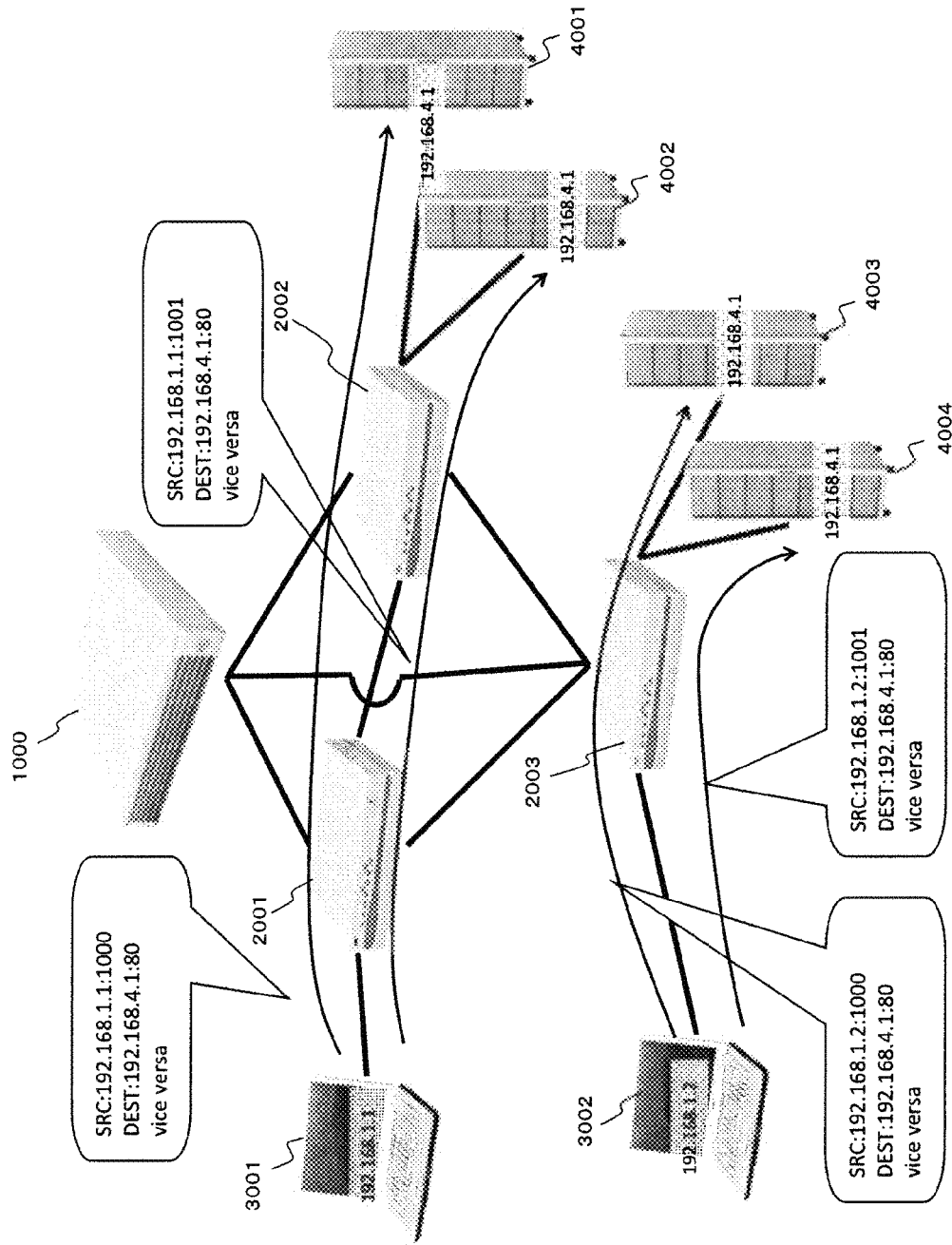
FIG. 15 illustrates a load distribution state in which flows are controlled on the configuration in FIG. 8.

Similarly, if the client apparatuses 3001 and 3002 subsequently request services via the respective port numbers 1001, the client apparatuses 3001 and 3002 establish forwarding routes with the server terminals 4002 and 4004 and provision of the services is started. FIG. 15 illustrates a load distribution state in which the above forwarding routes are set on the configuration in FIG. 8.

Subsequently, when the service provision ends, that is, when the necessary flow ends, the client apparatus 3001 sends a FIN packet to release the connection.

Figure 16:
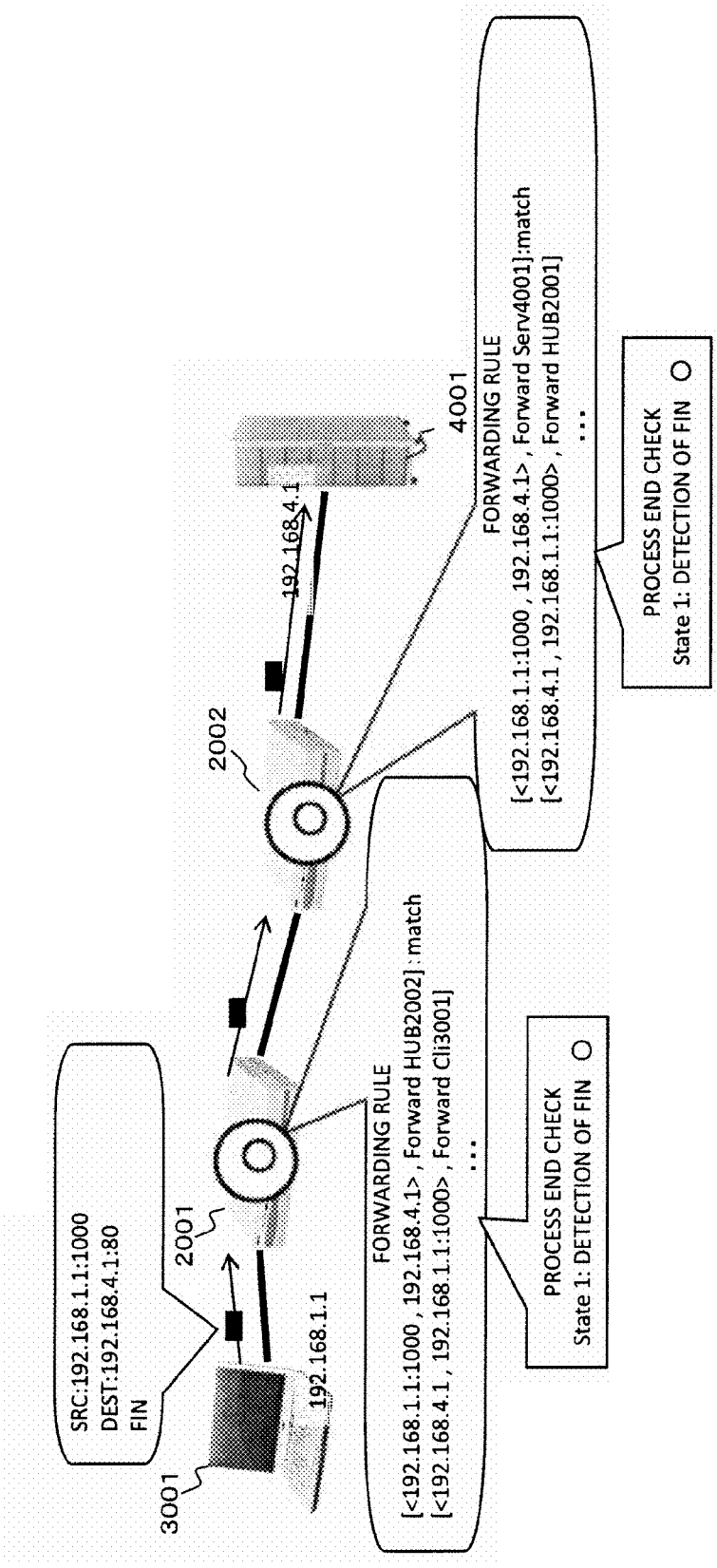
FIG. 16 illustrates a flow end check operation executed by the packet forwarding apparatuses.

FIG. 16 illustrates HUB operations of receiving the above FIN packet and checking a flow end. When the packet forwarding unit 200-1 of the HUB 2001 forwards the FIN packet, the flow end check unit 220-1 detects a flow end and starts monitoring an end handshake.

Upon receiving the FIN packet from the client apparatus 3001, the packet forwarding unit 200-1 of the HUB 2001 forwards the FIN packet to the HUB 2002 in accordance with the forwarding rule, and simultaneously, the flow end check unit 220-1 of the HUB 2001 determines reaching of the first stage of the process end determination (State 1 in FIG. 16).

Figure 17:
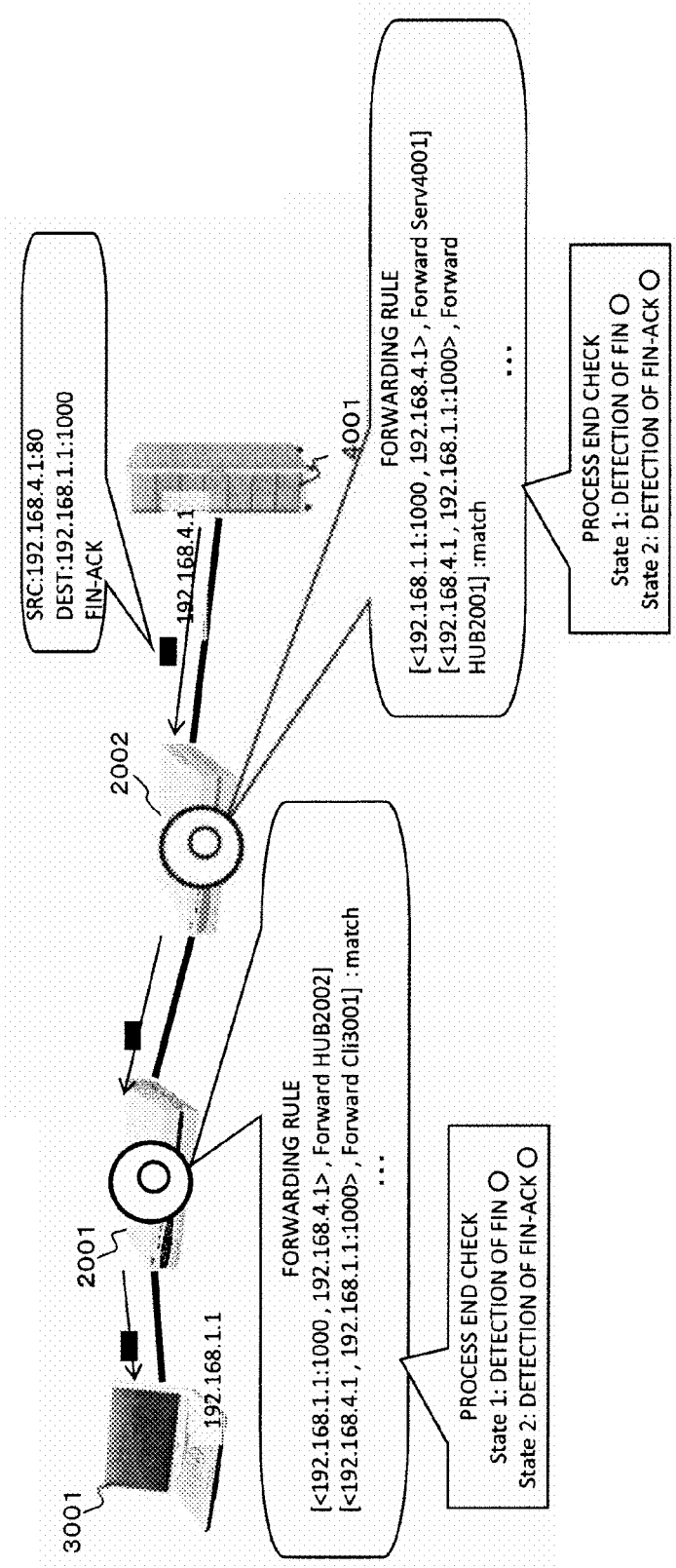
FIG. 17 illustrates a flow end check operation executed by the packet forwarding apparatuses.

FIG. 17 illustrates operations subsequent to FIG. 16. Next, the flow end check unit 220-1 monitors a FIN-ACK packet, which is a reply to the FIN packet and a FIN request from the server apparatus 4001. The HUB 2001 receives a FIN-ACK packet from the server terminal 4001 via the HUB 2002. When the HUB 2001 receives a FIN-ACK packet, the packet forwarding unit 200-1 forwards the FIN-ACK packet to the Cli 2001 in accordance with the forwarding rule, and simultaneously, the flow end check unit 220-1 determines the second stage of the process end determination (State 2 in FIG. 17).

Figure 18:
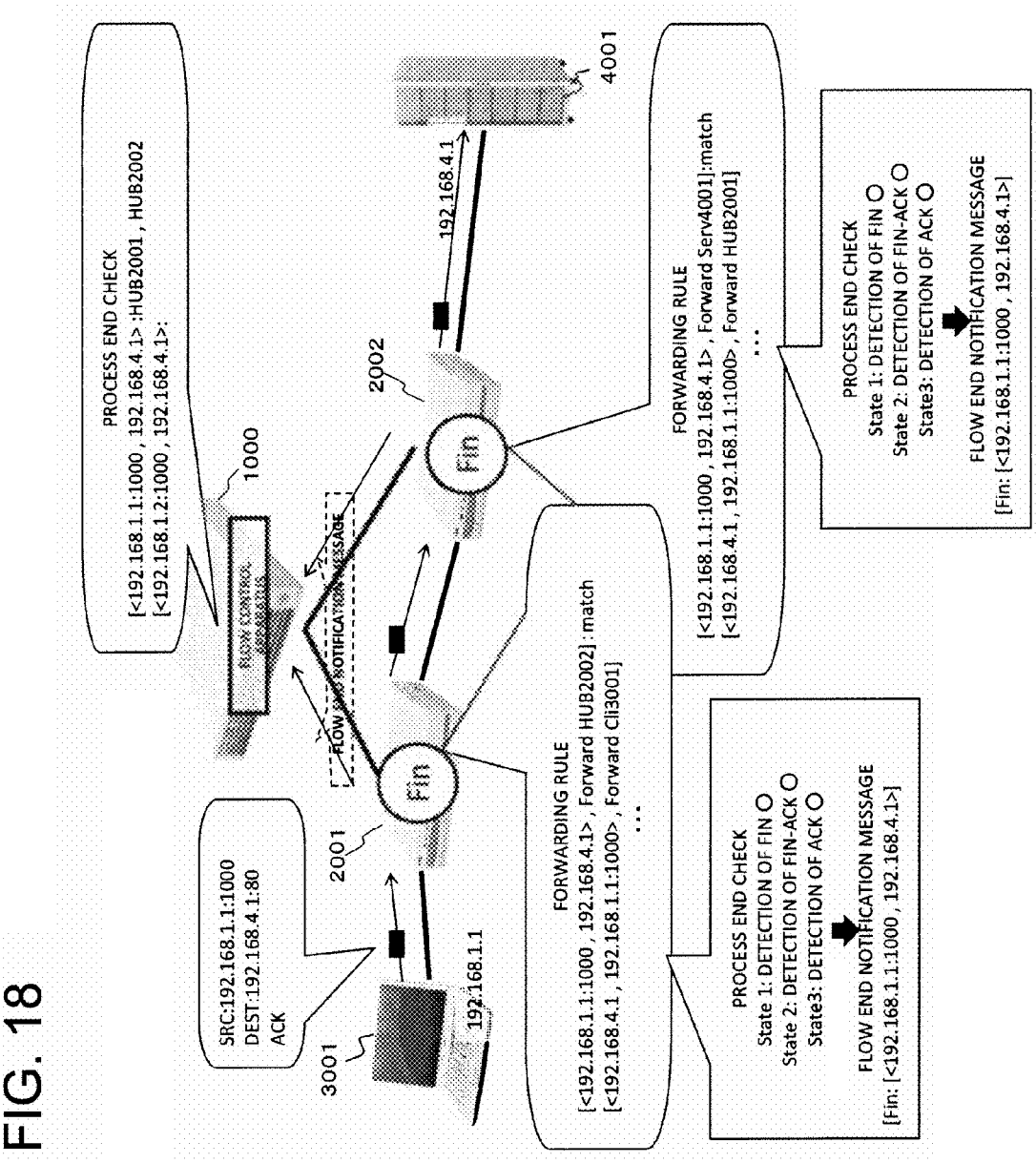
FIG. 18 illustrates a flow end check operation executed by the packet forwarding apparatuses.

FIG. 18 illustrates operations subsequent to FIG. 17. Finally, the HUB 2001 receives the final ACK packet from the client apparatus 3001. When the HUB 2001 receives the final ACK packet, the packet forwarding unit 200-1 forwards the ACK packet to the HUB 2002 in accordance with the forwarding rule, and simultaneously, the flow end check unit 220-1 determines a process end (State 3 in FIG. 18). Thus, the flow end check unit 220-1 sends a flow end notification message [Fin: [<192.168.1.1:1000, 192.168.4.1>] to the flow end determination unit 120 (step C13 in FIG. 7).

The HUB 2002 executes the same process. Namely, a flow end notification message [Fin: [<192.168.1.1:1000, 192.168.4.1>] is sent to the flow route setting unit 103 via the packet forwarding unit 200-2.

Regarding the flow identifier <192.168.1.1:1000, 192.168.4.1>, the flow end determination unit 120 of the controller apparatus 1000 receives the flow end notification message [Fin: [<192.168.1.1:1000, 192.168.4.1>] from the HUBs 2001 and 2002 and updates information in the process end information storage unit 130 (step C14 in FIG. 7). In this way, the HUBs 2001 and 2002 at both ends check flow end information and determine a service end (step C15 in FIG. 7).

Figure 19:
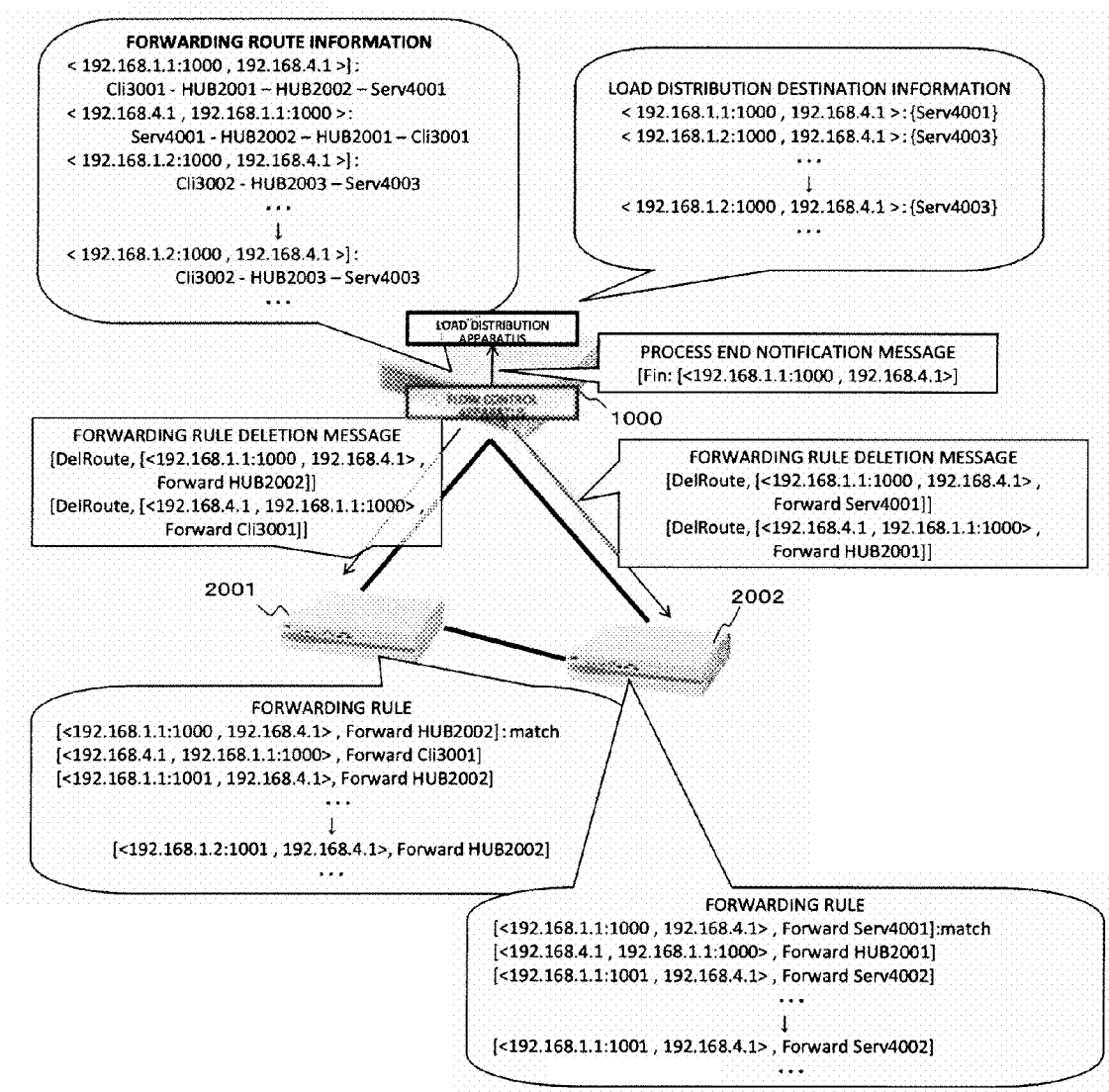
FIG. 19 illustrates an operation of the controller apparatus that has received a flow end notification from the packet forwarding apparatuses.

FIG. 19 illustrates operations subsequent to FIG. 18. After determining a service end, the flow end determination unit 120 sends [Fin: [<192.168.1.1:1000, 192.168.4.1>] to the flow route setting unit 103. After notified of a flow end, to delete the flow forwarding rules corresponding to the flow identifier <192.168.1.1:1000, 192.168.4.1> and the reverse direction <192.168.4.1, 192.168.1.1:1000>, the flow route setting unit 103 sends the forwarding rule deletion messages [DelRoute, [<192.168.1.1:1000, 192.168.4.1>, Forward HUB2002]] and [DelRoute, [<192.168.4.1, 192.168.1.1:1000>, Forward Cli3001]] to the HUB 2001 and DelRoute, [<192.168.1.1:1000, 192.168.4.1>, Forward Serv4001]] and [DelRoute, [<192.168.4.1, 192.168.1.1:1000>, Forward HUB2001]] to the HUB 2002, respectively.

The packet forwarding unit 200-1 of the HUB 2001 deletes the corresponding forwarding rules from the forwarding rule storage unit 210-1, in accordance with the forwarding rule deletion message. Likewise, the packet forwarding unit 200-2 of the HUB 2002 deletes the corresponding forwarding rules from the forwarding rule storage unit 210-2, in accordance with the forwarding rule deletion message. In addition, the flow route setting unit 103 deletes flow forwarding route information corresponding to the flow identifier <192.168.1.1:1000, 192.168.4.1> and the reverse direction <192.168.4.1, 192.168.1.1:1000> from the forwarding route storage unit 110. In addition, the flow end determination unit 120 sends a process end notification message [Fin: [<192.168.1.1:1000, 192.168.4.1>] to the load distribution destination determination unit 303, to request deletion of the load distribution destination information corresponding to the flow identifier <192.168.1.1:1000, 192.168.4.1>.

In addition, upon receiving the process end message, the load distribution destination determination unit 303 deletes the load distribution destination information corresponding to the flow identifier from the load distribution destination storage unit (step C16 in FIG. 7).

Based on the above flow, a single flow end process in which load distribution is enabled is completed. By the repeating the determination process of the load distribution destination and the deletion process during the process of forwarding the packet as herein above mentioned. In this way, a load distribution process using a session as a trigger is realized.

While preferred exemplary embodiments and a specific example of the present invention have thus been described, the present invention is not limited to the above exemplary embodiments. Further variations, substitutions, or adjustments can be made without departing from the basic technical concept of the present invention.

For example, while the above specific example has been described based on the fourth exemplary embodiment of the present invention, similar implementation examples are applicable based on any one of the first to third exemplary embodiments. In addition, by combining differences among the exemplary embodiments, still other exemplary embodiments can be obtained. For example, by adding load monitoring units to the load distribution apparatus according to the second exemplary embodiment, a fifth exemplary embodiment can be obtained.

Figure 20:
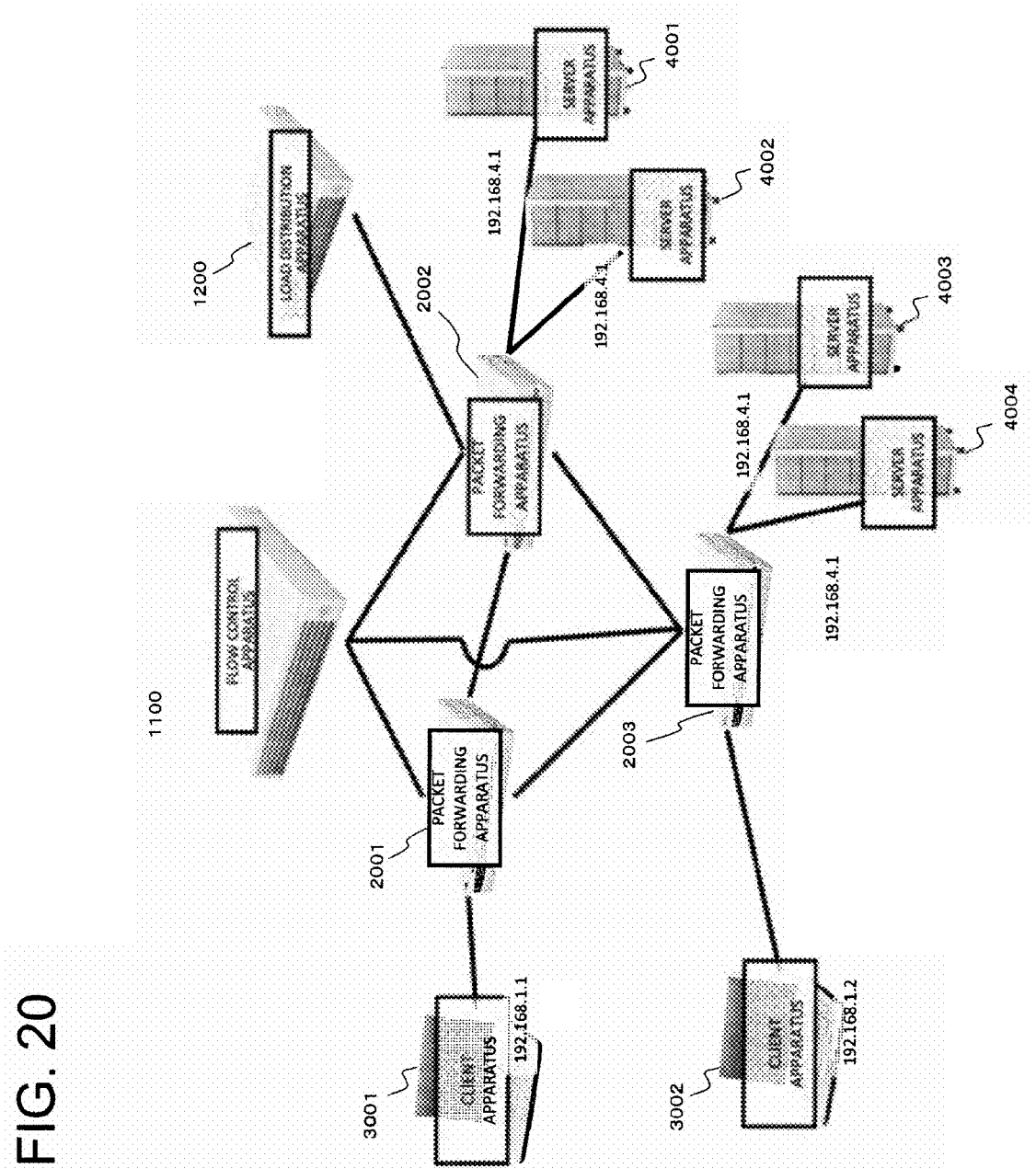
FIG. 20 illustrates a configuration example in which a flow control apparatus and a load distribution apparatus are separated.
Figure 21:
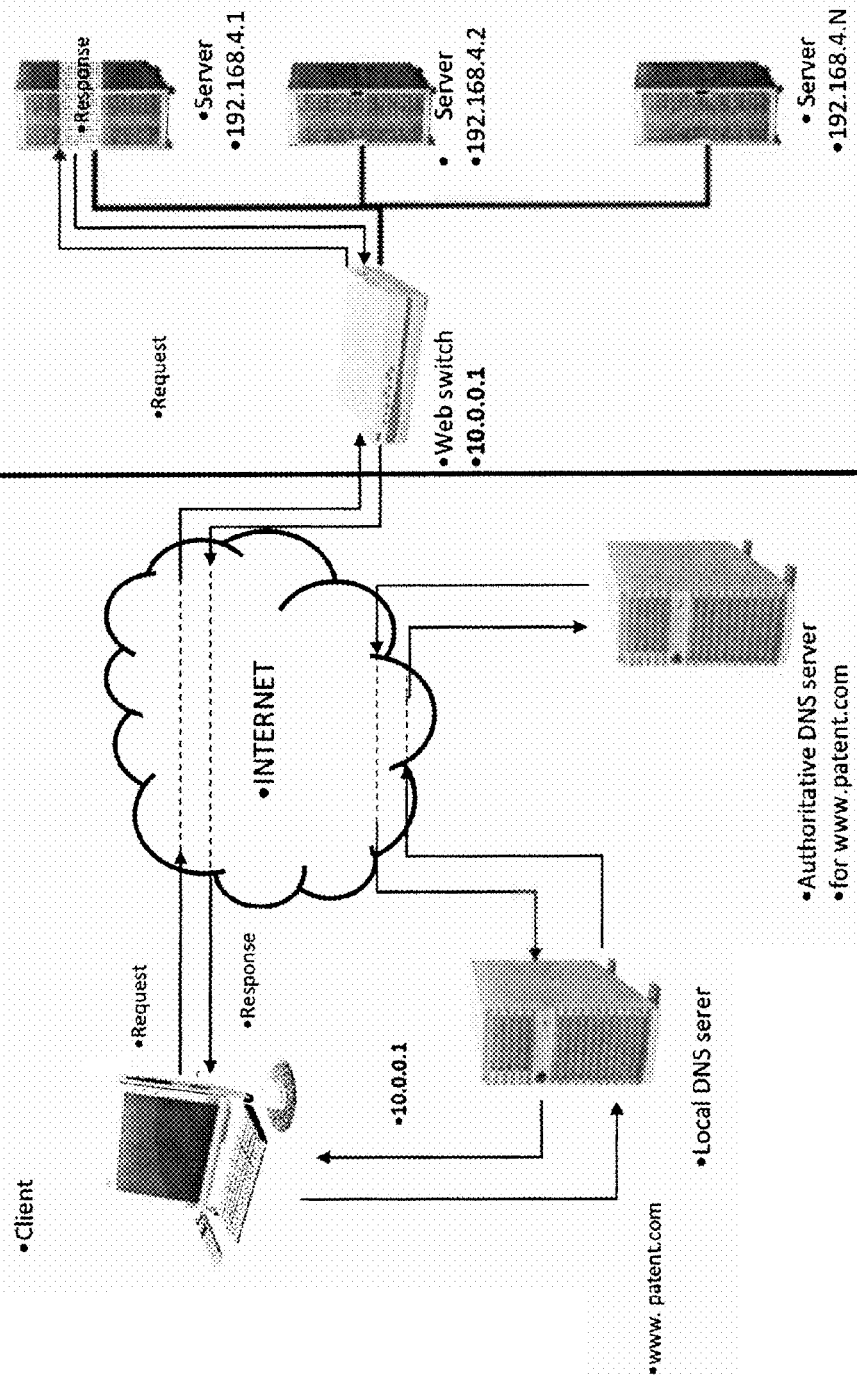
FIG. 21 illustrates the 2-way architecture described as background art.
Figure 22:
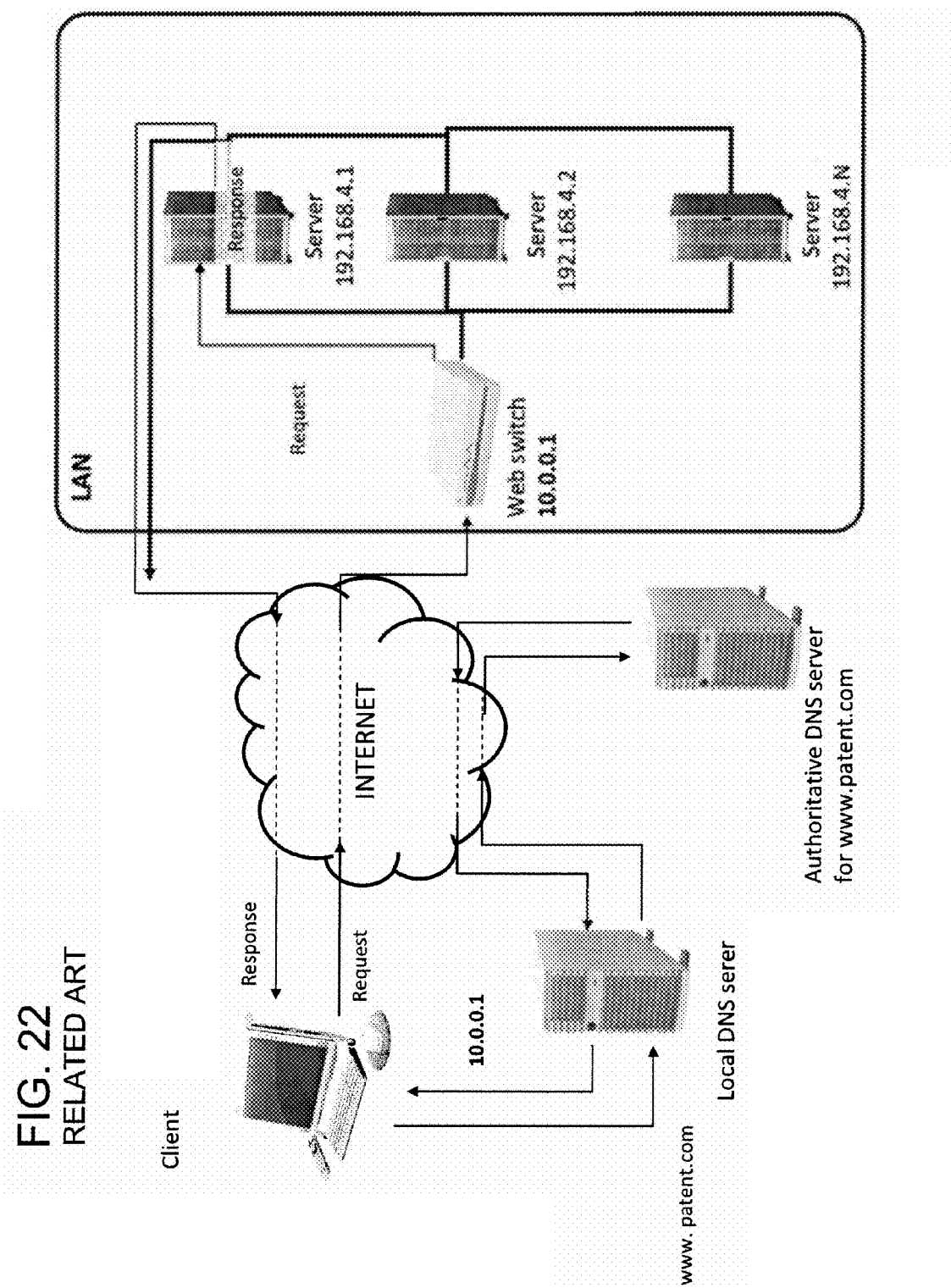
FIG. 22 illustrates the 1-way architecture described as background art.
Figure 23:
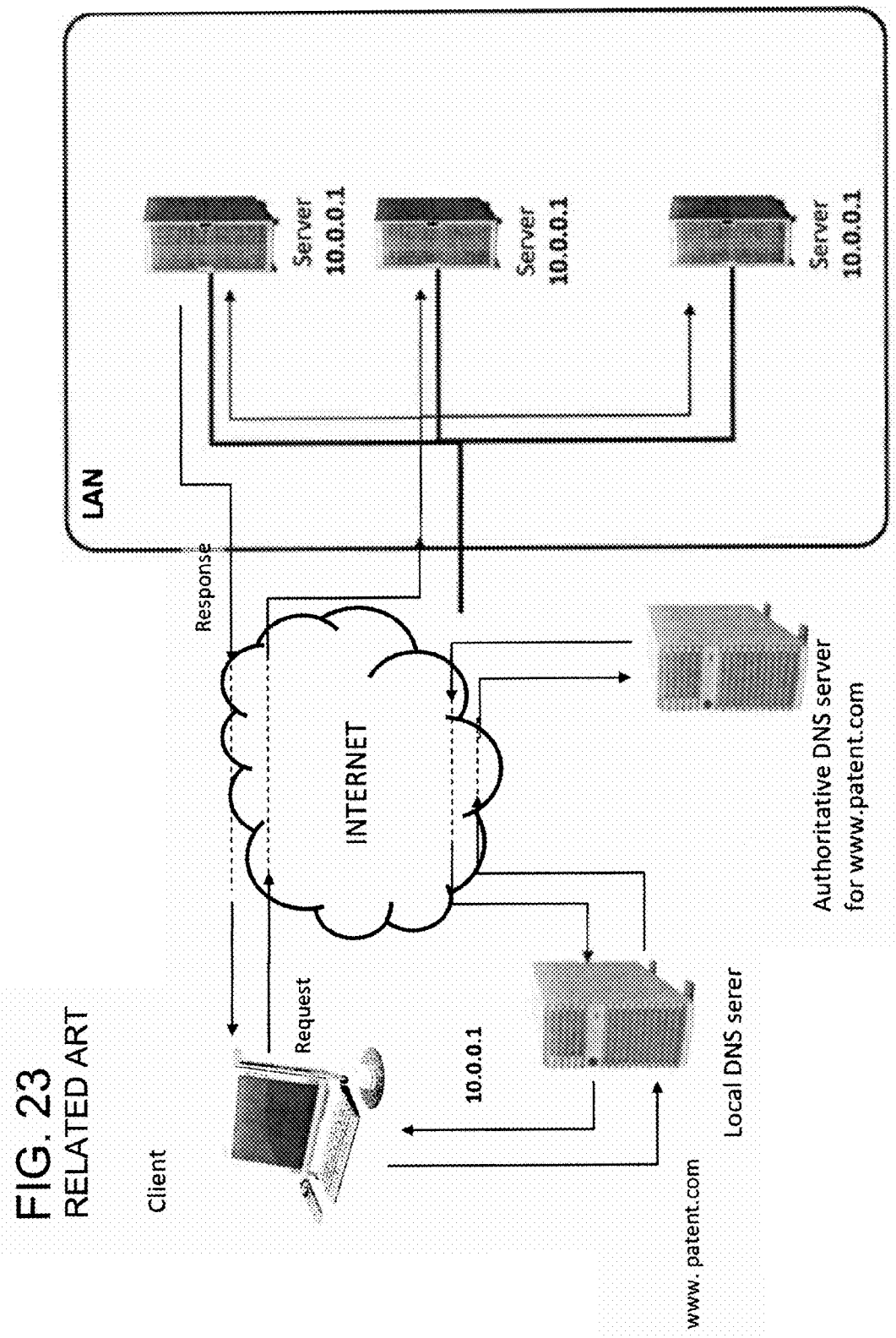
FIG. 23 illustrates the distribution-type system described as background art.
Figure 24:
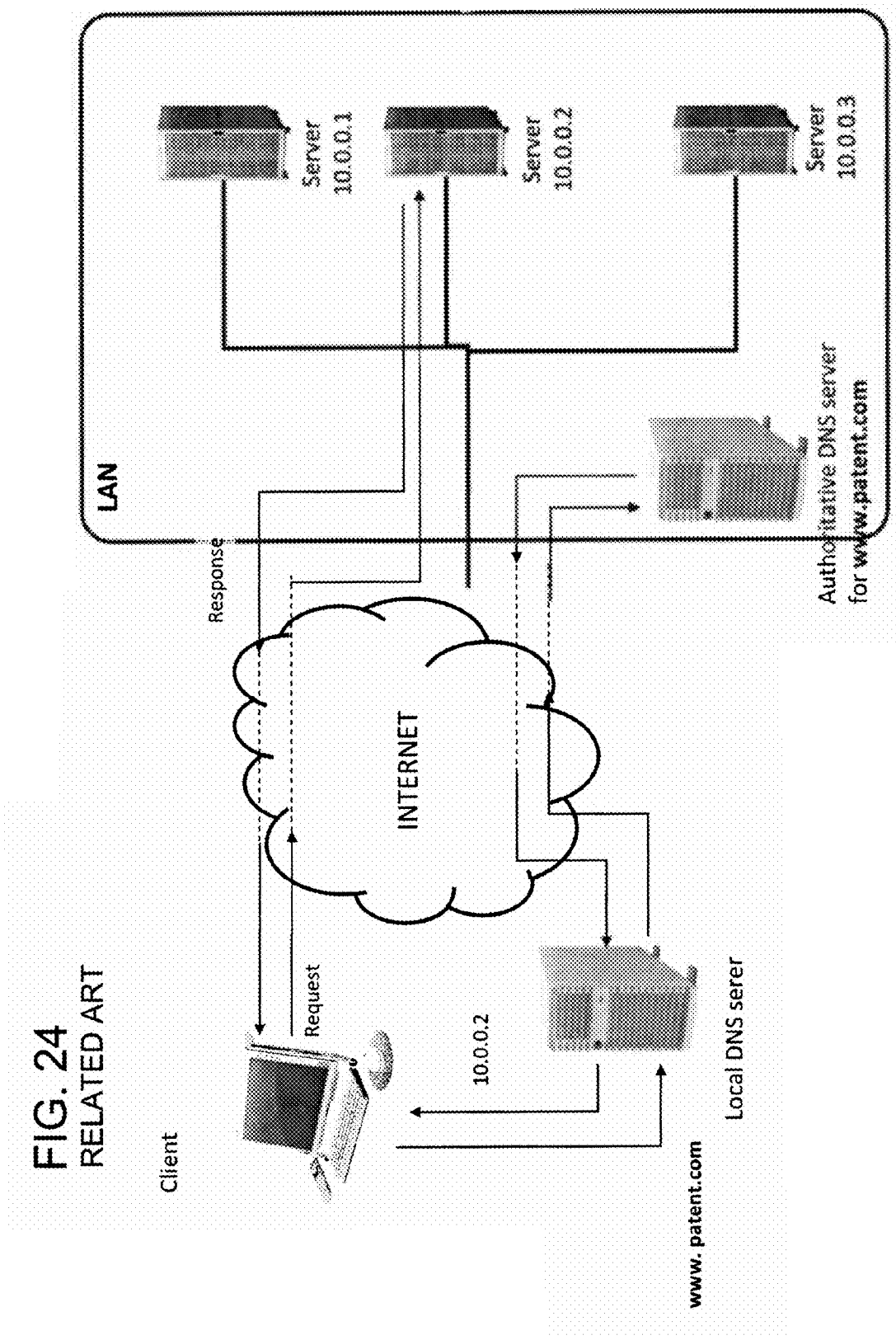
FIG. 24 illustrates the system executing DNS balancing described as background art.
Figure 25:
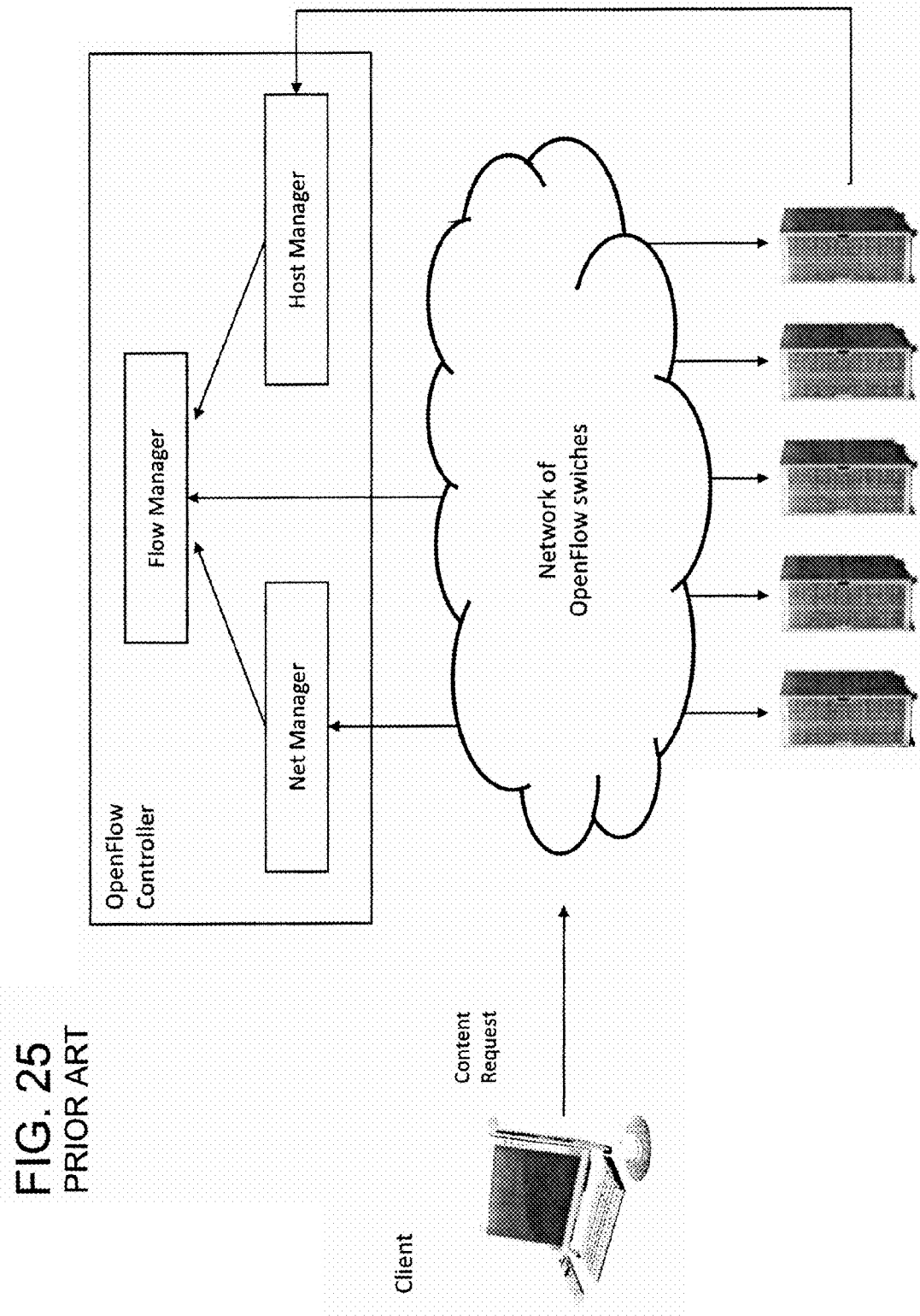
FIG. 25 illustrates Plug-n-Serve in Non-Patent Document 2.

FIG. 20 illustrates a configuration example in which the load distribution apparatus in the controller apparatus in FIG. 8 is configured in a separate configuration as a dedicated apparatus. The configuration in FIG. 20 is identical to the configurations in FIGS. 1, 3, 5, and 6 used to describe the first to fourth exemplary embodiments. Only the difference from the above specific example is that the communication between the flow route setting unit and the load distribution destination determination unit is executed via the packet forwarding unit 200. Thus, the packet forwarding unit needs to execute in advance a process of creating a forwarding route for messages exchanged between the flow route setting unit and the load distribution destination determination unit. However, no change is caused in the basic operations and meritorious effects.

INDUSTRIAL APPLICABILITY

For example, the present invention is applicable as a load distribution system providing a large-scale data center as a single virtual calculator. In addition, the present invention is applicable as a load distribution system optimizing the response speed by communication route optimization. In addition, the present invention is applicable as a load distribution system having a communication band guarantee function. The disclosures of Non-Patent Documents are incorporated herein by reference thereto. Variations and adjustments of the exemplary embodiments are possible within the scope of the overall disclosure (including claims) of the present invention and based on the basic technical concept of the invention. In addition, various combinations and selections of various disclosed elements are possible within the scope of the claims of the present invention. That is, the present invention of course includes various variations and modifications that could be made by those skilled in the art according to the overall disclosure including the claims and the technical concept.

Finally, exemplary modes of the invention that can be incorporated in the claims of the present invention will be listed as notes.

[Note 1]
A load distribution system, comprising: at least one packet forwarding apparatus comprising: a packet forwarding unit being connected to a flow control apparatus, that forwards an input packet in accordance with a flow forwarding rule sent from the flow control apparatus, and requests the flow control apparatus to determine a forwarding route for a packet that does not match the forwarding rule; and a flow end check unit that detects a flow end; a load distribution apparatus that is connected to the flow control apparatus, refers to a flow end notification sent from the flow control apparatus, and determines a load distribution destination from among a plurality of service provider servers; and a flow control apparatus comprising: a flow route setting unit that requests the load distribution apparatus to determine a load distribution destination in response to a forwarding route determination request from the packet forwarding apparatus, that determines a forwarding route for a flow using a determined service provider server, and notifies a packet forwarding apparatus on the forwarding route of a forwarding rule realizing the forwarding route; and a flow end determination unit that notifies the load distribution apparatus of a flow end based on flow end information detected by the packet forwarding apparatus.

[Note 2]
A load distribution system, in which the flow control apparatus and the load distribution apparatus are realized as a single apparatus.

[Note 3]
A load distribution method, comprising: causing the load distribution apparatus to delete, based on a flow end notification sent from the flow control apparatus, a service provider server corresponding to the ended flow from a load distribution destination storage unit that stores the service provider server determined as the load distribution destination; and causing the flow control apparatus to delete, based on flow end information detected by a packet forwarding apparatus, route information corresponding to the ended flow from a forwarding route storage unit that stores a forwarding route for a flow using a service provider server determined by the load distribution apparatus and to instruct a packet forwarding apparatus located on the route to be deleted to delete a forwarding rule corresponding to the ended flow.

[Note 4]
A load distribution apparatus, that refers to a flow end notification sent from a flow control apparatus of the present invention and determines a load distribution destination from among a plurality of service provider servers.

[Note 5]

A program, causing a computer forming a packet forwarding apparatus to execute: a process of forwarding an input packet in accordance with a flow forwarding rule sent from a flow control apparatus of the present invention; a process of requesting the flow control apparatus to determine a forwarding route for a packet that does not match the forwarding rule; and a process of detecting a flow end.

[Note 6]

A program, causing a computer forming a load distribution apparatus to execute a process of referring to a flow end notification sent from a flow control apparatus of the present invention and determining a load distribution destination from among a plurality of service provider servers.

[Note 7]

A program, causing a computer forming a flow control apparatus to execute: a process of requesting a predetermined load distribution apparatus to determine a load distribution destination in response to a forwarding route determination request sent from a packet forwarding apparatus, determining a forwarding route for a flow using a determined service provider server, and notifying a packet forwarding apparatus on the forwarding route of a forwarding rule realizing the forwarding route; and a process of notifying the load distribution apparatus of a flow end based on flow end information detected by the packet forwarding apparatus.

In the following, preferred modes are summarized.

[Mode 1]

A load distribution system, comprising: at least one packet forwarding apparatus comprising: a packet forwarding unit that forwards a packet by using a forwarding rule sent from a flow control apparatus; and a flow end check unit that detects a flow end; a load distribution apparatus that determines a load distribution destination from among a plurality of service provider servers by referring to a flow end notification sent from the flow control apparatus; and a flow control apparatus comprising: a flow route setting unit that determines a forwarding route for a flow using a service provider server determined by the load distribution apparatus and notifies a packet forwarding apparatus on the forwarding route of a forwarding rule realizing the forwarding route; and a flow end determination unit that notifies the load distribution apparatus of a flow end, based on flow end information detected by the packet forwarding apparatus.

[Mode 2]

The load distribution system according to mode 1; wherein the flow control apparatus comprises a forwarding route storage unit that stores a forwarding route for a flow using a service provider server determined by the load distribution apparatus; and wherein the flow control apparatus deletes route information about the ended flow from the forwarding route storage unit, based on flow end information detected by the packet forwarding apparatus, and instructs a packet forwarding apparatus located on the route to be deleted to delete a forwarding rule for the ended flow.

[Mode 3]

The load distribution system according to mode 2; wherein the flow control apparatus further comprises a flow end information storage unit that stores flow end information detected by the packet forwarding apparatus; and wherein, when deletion of route information about the ended flow from the forwarding route storage unit and instructions to a packet forwarding apparatus located on the route to be deleted to delete a forwarding rule for the ended flow are completed, the flow control apparatus deletes the flow end information from the flow end information storage unit.

[Mode 4]

The load distribution system according to any one of modes 1 to 3; wherein, when a flow forwarding route is determined, the flow route setting unit creates end check information indicating a packet forwarding apparatus determining the end of the flow on the determined flow forwarding route and notifies the flow end determination unit of the end check information; and wherein the flow end determination unit determines a flow end by using the end check information.

[Mode 5]

The load distribution system according to any one of modes 1 to 4; wherein the load distribution apparatus comprises: a load distribution destination storage unit that stores a service provider server determined as the load distribution destination; a load monitoring unit that monitors load on a calculator serving as the packet forwarding apparatus or the service provider server; and a load distribution destination determination unit that manages an allocation state of service provider servers by deleting a service provider server for the ended flow from the load distribution destination storage unit, based on a flow end notification sent from the flow control apparatus, and determining a load distribution destination from among the plurality of service provider servers, based on an allocation state of each service provider server managed by the load distribution destination storage unit and a load state of a calculator serving as the packet forwarding apparatus or the service provider server monitored by the load monitoring unit.

[Mode 6]

The load distribution system according to mode 5; wherein the load distribution apparatus selects a plurality of load distribution destinations from among the plurality of service provider servers; and wherein the flow route setting unit selects one service provider server from among the plurality of load distribution destinations by using a predetermined route determination rule.

[Mode 7]

The load distribution system according to mode 6; wherein the flow route setting unit notifies the load distribution apparatus of a service provider server selected from among the plurality of load distribution destinations; and wherein the load distribution apparatus updates an allocation state of each service provider server managed by the load distribution destination storage unit, based on the notification.

[Mode 8]

A load distribution method, comprising: causing a load distribution apparatus to refer to a flow end notification sent from a flow control apparatus and to determine a load distribution destination from among a plurality of service provider servers; causing the flow control apparatus to determine a forwarding route for a flow using a service provider server determined by the load distribution apparatus and to notify a packet forwarding apparatus on the forwarding route of a forwarding rule realizing the forwarding route; causing the packet forwarding apparatus to use a forwarding rule sent from the flow control apparatus, to forward a packet, to inspect whether the forwarded packet is a flow end packet, and to send a report to the flow control apparatus; and causing the flow control apparatus to notify the load distribution apparatus of a flow end, based on a report that the packet forwarding apparatus has forwarded a flow end packet.

[Mode 9]

A packet forwarding apparatus, comprising: a packet forwarding unit that forwards an input packet in accordance with a flow forwarding rule sent from a predetermined flow control apparatus and requesting the flow control apparatus to determine a forwarding route for a packet that does not match the forwarding rule; and a flow end check unit that detects a flow end.

[Mode 10]

A flow control apparatus, comprising: a flow route setting unit that determines a forwarding route for a flow using a service provider server determined by a predetermined load distribution apparatus and notifying a packet forwarding apparatus on the forwarding route of a forwarding rule realizing the forwarding route; and a flow end determination unit that notifies the load distribution apparatus of a flow end, based on flow end information detected by the packet forwarding apparatus.

It is to be noted that the various disclosures of the above-mentioned Patent Documents are incorporated herein by reference thereto. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. That is, the present invention clearly includes every type of transformation and modification that a person skilled in the field can realize according to the entire disclosure including the scope of the claims and to technological concepts thereof.

EXPLANATIONS OF SYMBOLS 10, 11, 13 flow control apparatus
100, 101, 103 flow route setting unit
110 forwarding route storage unit
120, 121 flow end determination unit
130 flow end information storage unit
20 packet forwarding apparatus
200 packet forwarding unit
210 forwarding rule storage unit
220 flow end check unit
30, 33, 1200 load distribution apparatus
300, 302, 303 load distribution destination determination unit
310, 313 load distribution destination storage unit
322 load monitoring unit
1000, 1100 controller apparatus (flow control apparatus) (dedicated control terminal, calculator, computer)
2000 HUB, switch, router
40, 3001, 3002 client apparatus (calculator, computer)
400 service request unit
50, 4001, 4002, 4003, 4004 server apparatus (calculator, computer)
500 service provider unit

What is claimed is:

1. A load distribution system, comprising: at least one packet forwarding apparatus comprising: a packet forwarding unit that forwards a packet by using a forwarding rule sent from a flow control apparatus; and a flow end check unit that detects a flow end; a load distribution apparatus that determines a load distribution destination from among a plurality of service provider servers by referring to a flow end notification sent from the flow control apparatus; and a flow control apparatus comprising: a flow route setting unit that determines a forwarding route for a flow using a service provider server determined by the load distribution apparatus and notifies a packet forwarding apparatus on the forwarding route of a forwarding rule realizing the forwarding route; and a flow end determination unit that notifies the load distribution apparatus of a flow end, based on flow end information detected by the packet forwarding apparatus; and a load distribution apparatus comprises: a load distribution destination storage unit that stores a service provider server determined as the load distribution destination;

a load monitoring unit that monitors load on a calculator serving as the packet forwarding apparatus or the service provider server; and a load distribution destination determination unit that manages an allocation state of service provider servers by deleting a service provider server for the ended flow from the load distribution destination storage unit, based on a flow end notification sent from the flow control apparatus, and determining a load distribution destination from among the plurality of service provider servers, based on an allocation state of each service provider server managed by the load distribution destination storage unit and a load state of a calculator serving as the packet forwarding apparatus or the service provider server monitored by the load monitoring unit.

2. The load distribution system according to claim 1, wherein the flow control apparatus comprises a forwarding route storage unit that stores a forwarding route for a flow using a service provider server determined by the load distribution apparatus, and wherein the flow control apparatus deletes route information about the ended flow from the forwarding route storage unit, based on flow end information detected by the packet forwarding apparatus, and instructs a packet forwarding apparatus located on the route to be deleted to delete a forwarding rule for the ended flow.

3. The load distribution system according to claim 2, wherein the flow control apparatus further comprises a flow end information storage unit that stores flow end information detected by the packet forwarding apparatus, and wherein, when deletion of route information about the ended flow from the forwarding route storage unit and instructions to a packet forwarding apparatus located on the route to be deleted to delete a forwarding rule for the ended flow are completed, the flow control apparatus deletes the flow end information from the flow end information storage unit.

4. The load distribution system according to claim 1, wherein, when a flow forwarding route is determined, the flow route setting unit creates end check information indicating a packet forwarding apparatus determining the end of the flow on the determined flow forwarding route and notifies the flow end determination unit of the end check information; and wherein the flow end determination unit determines a flow end by using the end check information.

5. The load distribution system according to claim 1, wherein the load distribution apparatus comprises:

a load distribution destination storage unit that stores a service provider server determined as the load distribution destination;

a load monitoring unit that monitors load on a calculator serving as the packet forwarding apparatus or the service provider server; and a load distribution destination determination unit that manages an allocation state of service provider servers by deleting a service provider server for the ended flow from the load distribution destination storage unit, based on a flow end notification sent from the flow control apparatus, and determining a load distribution destination from among the plurality of service provider servers, based on an allocation state of each service provider server managed by the load distribution destination storage unit and a load state of a calculator serving as the packet forwarding apparatus or the service provider server monitored by the load monitoring unit.

6. The load distribution system according to claim 5, wherein the load distribution apparatus selects a plurality of load distribution destinations from among the plurality of service provider servers, and wherein the flow route setting unit selects one service provider server from among the plurality of load distribution destinations by using a predetermined route determination rule.

7. The load distribution system according to claim 6, wherein the flow route setting unit notifies the load distribution apparatus of a service provider server selected from among the plurality of load distribution destinations, and wherein the load distribution apparatus updates an allocation state of each service provider server managed by the load distribution destination storage unit, based on the notification.

8. A load distribution method, comprising: causing a load distribution apparatus to refer to a flow end notification sent from a flow control apparatus and to determine a load distribution destination from among a plurality of service provider servers; causing the flow control apparatus to determine a forwarding route for a flow using a service provider server determined by the load distribution apparatus and to notify a packet forwarding apparatus on the forwarding route of a forwarding rule realizing the forwarding route; causing the packet forwarding apparatus to use a forwarding rule sent from the flow control apparatus, to forward a packet, to inspect whether the forwarded packet comprises a flow end packet, and to send a report to the flow control apparatus; and causing the flow control apparatus to notify the load distribution apparatus of a flow end, based on a report that the packet forwarding apparatus has forwarded a flow end packet; wherein the load distribution apparatus comprises:

a load distribution destination storage unit that stores a service provider server determined as the load distribution destination; a load monitoring unit that monitors load on a calculator serving as the packet forwarding apparatus or the service provider server; and a load distribution destination determination unit that manages an allocation state of service provider servers by deleting a service provider server for the ended flow from the load distribution destination storage unit, based on a flow end notification sent from the flow control apparatus, and determining a load distribution destination from among the plurality of service provider servers, based on an allocation state of each service provider server managed by the load distribution destination storage unit and a load state of a calculator serving as the packet forwarding apparatus or the service provider server monitored by the load monitoring unit.

9. A load distribution method, comprising: at least one packet forwarding apparatus comprising: a packet forwarding unit that forwards an input packet in accordance with a flow forwarding rule sent from a predetermined flow control apparatus and requesting the flow control apparatus to determine a forwarding route for a packet that does not match the forwarding rule; and a flow end check unit that detects a flow end; a load distribution apparatus that determines a load distribution destination from among a plurality of service provider servers by referring to a flow end notification sent from the flow control apparatus; and a flow control apparatus comprising: a flow route setting unit that determines a forwarding route for a flow using a service provider server determined by the load distribution apparatus and notifies a packet forwarding apparatus on the forwarding route of a forwarding rule realizing the forwarding route; and a flow end determination unit that notifies the load distribution apparatus of a flow end, based on flow end information detected by the packet forwarding apparatus; the load distribution apparatus comprises: a load distribution destination storage unit that stores a service provider server determined as the load distribution destination; a load monitoring unit that monitors load on a calculator serving as the packet forwarding apparatus or the service provider server; and a load distribution destination determination unit that manages an allocation state of service provider servers by deleting a service provider server for the ended flow from the load distribution destination storage unit, based on a flow end notification sent from the flow control apparatus, and determining a load distribution destination from among the plurality of service provider servers, based on an allocation state of each service provider server managed by the load distribution destination storage unit and a load state of a calculator serving as the packet forwarding apparatus or the service provider server monitored by the load monitoring unit.

10. A load distribution system, comprising: at least one packet forwarding apparatus comprising: a packet forwarding unit that forwards a packet by using a forwarding rule sent from a flow control apparatus; and a flow end check unit that detects a flow end; a load distribution apparatus that determines a load distribution destination from among a plurality of service provider servers by referring to a flow end notification sent from the flow control apparatus; and a flow control apparatus comprising:

a flow route setting unit that determines a forwarding route for a flow using a service provider server determined by a predetermined load distribution apparatus and notifies a packet forwarding apparatus on the forwarding route of a forwarding rule realizing the forwarding route; and a flow end determination unit that notifies the load distribution apparatus of a flow end, based on flow end information detected by the packet forwarding apparatus and the load distribution apparatus further comprises: a load distribution destination storage unit that stores a service provider server determined as the load distribution destination; a load monitoring unit that monitors load on a calculator serving as the packet forwarding apparatus or the service provider server; and a load distribution destination determination unit that manages an allocation state of service provider servers by deleting a service provider server for the ended flow from the load distribution destination storage unit, based on a flow end notification sent from the flow control apparatus, and determining a load distribution destination from among the plurality of service provider servers, based on an allocation state of each service provider server managed by the load distribution destination storage unit and a load state of a calculator serving as the packet forwarding apparatus or the service provider server monitored by the load monitoring unit.

11. The load distribution system according to claim 1, wherein the flow control apparatus and the load distribution apparatus are realized as a single apparatus.

12. The load distribution method according to claim 8, wherein said method further comprises:

causing the load distribution apparatus to delete, based on a flow end notification sent from the flow control apparatus, a service provider server corresponding to the ended flow from a load distribution destination storage unit that stores the service provider server determined as the load distribution destination; and causing the flow control apparatus to delete, based on flow end information detected by a packet forwarding apparatus, route information corresponding to the ended flow from a forwarding route storage unit that stores a forwarding route for a flow using a service provider server determined by the load distribution apparatus and to instruct a packet forwarding apparatus located on the route to be deleted to delete a forwarding rule corresponding to the ended flow.

13. The load distribution system according to claim 2, wherein, when a flow forwarding route is determined, the flow route setting unit creates end check information indicating a packet forwarding apparatus determining the end of the flow on the determined flow forwarding route and notifies the flow end determination unit of the end check information, and
    wherein the flow end determination unit determines a flow end by using the end check information.

14. The load distribution system according to claim 3, wherein, when a flow forwarding route is determined, the flow route setting unit creates end check information indicating a packet forwarding apparatus determining the end of the flow on the determined flow forwarding route and notifies the flow end determination unit of the end check information, and
    wherein the flow end determination unit determines a flow end by using the end check information.

15. The load distribution system according to claim 3, wherein the load distribution apparatus comprises:
    a load distribution destination storage unit that stores a service provider server determined as the load distribution destination;
    a load monitoring unit that monitors load on a calculator serving as the packet forwarding apparatus or the service provider server; and
    a load distribution destination determination unit that manages an allocation state of service provider servers by deleting a service provider server for the ended flow from the load distribution destination storage unit, based on a flow end notification sent from the flow control apparatus, and determining a load distribution destination from among the plurality of service provider servers, based on an allocation state of each service provider server managed by the load distribution destination storage unit and a load state of a calculator serving as the packet forwarding apparatus or the service provider server monitored by the load monitoring unit.

16. The load distribution system according to claim 4, wherein the load distribution apparatus comprises:
    a load distribution destination storage unit that stores a service provider server determined as the load distribution destination;
    a load monitoring unit that monitors load on a calculator serving as the packet forwarding apparatus or the service provider server; and
    a load distribution destination determination unit that manages an allocation state of service provider servers by deleting a service provider server for the ended flow from the load distribution destination storage unit, based on a flow end notification sent from the flow control apparatus, and determining a load distribution destination from among the plurality of service provider servers, based on an allocation state of each service provider server managed by the load distribution destination storage unit and a load state of a calculator serving as the packet forwarding apparatus or the service provider server monitored by the load monitoring unit.

17. The packet forwarding apparatus according to claim 9, further comprising:
    a load distribution apparatus that determines a load distribution destination from among a plurality of service provider servers by referring to a flow end notification sent from the flow control apparatus.

* * * * *